(12) United States Patent
Sengupta et al.

(10) Patent No.: US 11,818,768 B2
(45) Date of Patent: Nov. 14, 2023

(54) RESOURCES AND SCHEMES FOR UPLINK TRANSMISSIONS IN NARROWBAND COMMUNICATION

(71) Applicant: QUALCOMM Incorporated, San Diego, CA (US)

(72) Inventors: Ayan Sengupta, San Diego, CA (US); Alberto Rico Alvarino, San Diego, CA (US); Le Liu, Fremont, CA (US); Chao Wei, Beijing (CN); Umesh Phuyal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/257,267

(22) PCT Filed: Jul. 22, 2019

(86) PCT No.: PCT/CN2019/097024
§ 371 (c)(1),
(2) Date: Dec. 30, 2020

(87) PCT Pub. No.: WO2020/020094
PCT Pub. Date: Jan. 30, 2020

(65) Prior Publication Data
US 2021/0274568 A1 Sep. 2, 2021

(30) Foreign Application Priority Data

Jul. 23, 2018 (WO) ................ PCT/CN2018/096704

(51) Int. Cl.
*H04W 74/08* (2009.01)
*H04W 76/11* (2018.01)
(Continued)

(52) U.S. Cl.
CPC ..... *H04W 74/0841* (2013.01); *H04L 27/2607* (2013.01); *H04W 56/005* (2013.01); *H04W 74/02* (2013.01); *H04W 76/11* (2018.02)

(58) Field of Classification Search
CPC ........... H04W 72/0446; H04W 72/042; H04W 72/0453; H04W 74/0841; H04W 74/02;
(Continued)

(56) References Cited

U.S. PATENT DOCUMENTS

2012/0243448 A1* 9/2012 Pan ....................... H04W 48/16
370/280
2013/0044706 A1* 2/2013 Suzuki .................. H04L 5/0053
370/329
(Continued)

FOREIGN PATENT DOCUMENTS

CN 104981022 A 10/2015
CN 106788943 A 5/2017
(Continued)

OTHER PUBLICATIONS

CATT: "Further Details of UL Grant-Free Transmission for URLLC", 3GPP TSG RAN WG1 Meeting #89, R1-1707511, May 19, 2017, 4 pages.
(Continued)

*Primary Examiner* — Jamal Javaid
(74) *Attorney, Agent, or Firm* — Procopio, Cory, Hargreaves & Savitch LLP

(57) ABSTRACT

Apparatus, methods, and computer-readable media for facilitating using of pre-configured UL resources to transmit grant-free data or reference signals are disclosed herein. An example method for wireless communication by a UE includes transmitting, to a base station, a capability of the UE to transmit data in a first message of a random access procedure. The example method also includes receiving
(Continued)

pre-configured UL resources from the base station. The example method also includes transmitting data in the first message of the random access procedure using the pre-configured UL resources.

62 Claims, 14 Drawing Sheets

(51) Int. Cl.
*H04L 27/26* (2006.01)
*H04W 56/00* (2009.01)
*H04W 74/02* (2009.01)

(58) Field of Classification Search
CPC .. H04W 56/005; H04W 76/11; H04L 27/2607
See application file for complete search history.

(56) References Cited

U.S. PATENT DOCUMENTS

| | | | | |
|---|---|---|---|---|
| 2014/0233538 A1* | 8/2014 | Zhang | ............... | H04W 72/1205 370/336 |
| 2016/0057785 A1* | 2/2016 | Zhang | ................... | H04W 24/10 370/329 |
| 2016/0073292 A1* | 3/2016 | Fan | .................... | H04W 74/0833 370/230 |
| 2016/0270053 A1* | 9/2016 | Zeng | .................... | H04W 72/048 |
| 2016/0380751 A1* | 12/2016 | Lindoff | ................. | H04W 56/00 370/336 |
| 2017/0245158 A1* | 8/2017 | Xiao | ......................... | H04L 1/08 |
| 2018/0070335 A1 | 3/2018 | Amuru et al. | | |
| 2018/0092125 A1 | 3/2018 | Sun et al. | | |
| 2018/0270859 A1* | 9/2018 | Fan | ...................... | H04W 74/085 |
| 2018/0295651 A1* | 10/2018 | Cao | ........................ | H04W 72/14 |
| 2019/0020455 A1* | 1/2019 | Yamamoto | ......... | H04W 72/0446 |

FOREIGN PATENT DOCUMENTS

| | | | |
|---|---|---|---|
| CN | 107690173 A | 2/2018 | |
| CN | 108024366 A | 5/2018 | |
| CN | 108282895 A | 7/2018 | |
| EP | 3340726 A1 | 6/2018 | |
| WO | 2017088783 A1 | 6/2017 | |
| WO | 2018127201 A1 | 7/2018 | |

OTHER PUBLICATIONS

China Telecom: "UL Grant-Free Transmission for URLLC", 3GPP TSG RAN WG1 NR Ad-Hoc#2, R1-1710971, Jun. 30, 2017, 4 pages.
Google, Inc., "Discussion on NOMA procedure", 3GPP Tsg Ran WG1 Meeting #93, R1-1807209, May 25, 2018, 4 pages.
Institute for Information INDUSTRy (III)., "Issues and Control Design for UL Grant-free URLLC", 3GPP TSG-RAN WG1 NR AD-Hoc#2, R1-1711006, Jun. 30, 2017, 5 pages.
International Search Report and Written Opinion—PCT/CN2018/096704—ISA/EPO—Apr. 8, 2019-04-08.
International Search Report and Written Opinion - PCT/CN2019/097024 - ISA/EPO - 2019-09-27 184205WO2).
Qualcomm Incorporated: "On UE Capability #2 Processing Time", 3GPP Tsg-Ran WG1 Meeting #93, R1-1807365, May 25, 2018 (25.05.2018), pp. 1-10, the whole document.
_G Electronics Inc: "Considerations on 2-Step Cbra procedure for Nr-U Sa", 3GPP Tsg-Ran WG2 #Ah-1807 3GPP Draft, R2-1809940, Montreal, Canada, 2nd - 6th Jul. 2018, 3rd Generation Partnership Project (3GPP), Mobile competence Centre, 650, Route Des Lucioles, F-06921 Sophia-Antipolis Cedex, France, 22 Jun. 2018 (2018-06-22), )p. 1-3, XP051525763, Retrieved from the Internet: Url: http://www.3gpp.org/ftp/tsg%5Fran/WG2%5FRL2/TSGR2%3FAHs/2018%5F07%5FNR/Docs/R2%2D1809940%2Ezip, the whole document.
Motorola Mobility: "Physical Channel Design for 2-step Rach", 3GPP Tsg Ran WG1 Meeting Ah 1801, Draft, R1-1800727, 3rd Generation Partnership Project (3GPP), Mobile Competence Centre, 650, Route Des Lucioles, 7-06921 Sophia-Antipolis Cedex, France, vol. Ran WG1, No. Vancouver, Canada, 20180122 - 20180126, 4 pp., 13 Jan. 2018 (2018-01-13), XP051385042, Retrieved from the Internet: Url: http://www.3gpp.org/ftp/tsg%5Frant NG1%5FRLUTSGR1%5FAH/Nr%5FAH%5F1801/Docs/ [retrieved on 2018-01-13] sections 2, 3.
3 Samsung: "Discussion on NoMA Related Procedure", 3GPP Tsg Ran WG1 Meeting #93, Draft, R1-1806753, 3rd 3eneration Partnership Project (3GPP), Mobile Competence Centre, 650, Route Des Lucioles, F-06921 Sophia- Cedex, France, vol. Ran WG1, No. Busan, Korea, 20180521-20180525, 12 May 2018 (2018-05-12), 7 'ages, 20180520, XP051462737, Retrieved from the Internet: Url: http://www.3gpp.org/ftp/tsg%5FranNVG1%5FRL1/ TSGR1%5F93/ Docs [retrieved on 2018-05-12] pgs. 3 - 5, Sections 1-4, [retrieved on 2018-05-20] the whole document.
Supplementary European Search Report — EP19840252 — Search Authority — the Hague-022-04-04 (184205EP).

* cited by examiner

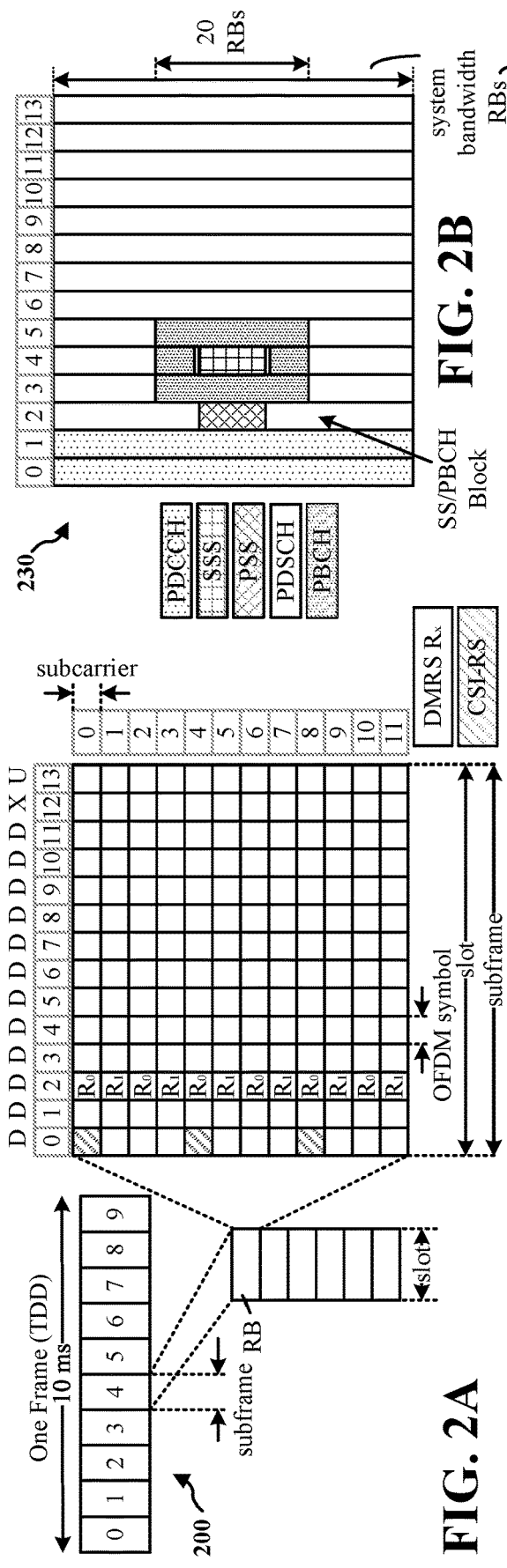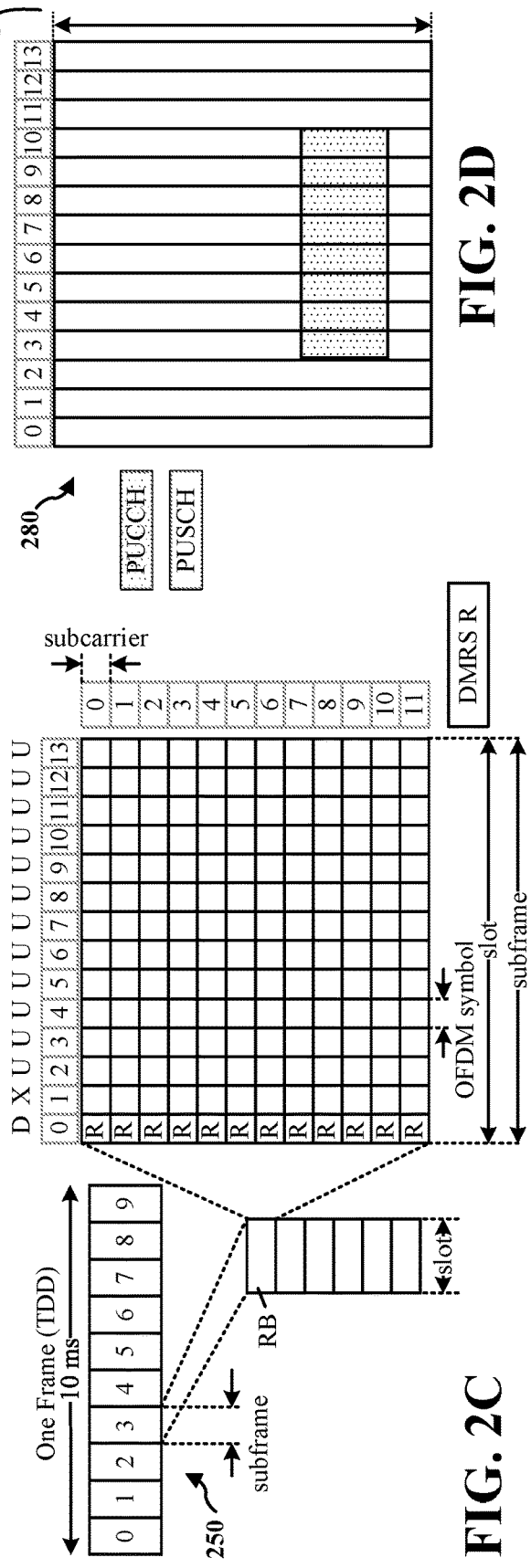

RESOURCES AND SCHEMES FOR UPLINK TRANSMISSIONS IN NARROWBAND COMMUNICATION

CROSS REFERENCE TO RELATED APPLICATION(S)

This application is a national stage application, filed under 35 U.S.C. § 371, of PCT International Patent Application Serial No. PCT/CN2019/097024, entitled "Resources and Schemes for Uplink Transmissions in Narrowband Communication," and filed on Jul. 22, 2019, which claims the benefit of International Patent Application Serial No. PCT/CN2018/096704, entitled "Resources and Schemes for Grant-Free Uplink Transmission in eMTC/NB-IoT," and filed on Jul. 23, 2018, which are each expressly incorporated by reference herein in their entirety.

BACKGROUND

Technical Field

The present disclosure relates generally to communication systems, and more particularly, to uplink transmissions of data and reference signals.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G/NR is part of a continuous mobile broadband evolution promulgated by Third Generation Partnership Project (3GPP) to meet new requirements associated with latency, reliability, security, scalability (e.g., with Internet of Things (IoT)), and other requirements. 5G/NR includes services associated with enhanced mobile broadband (eMBB), massive machine type communications (mMTC), and ultra-reliable low latency communications (URLLC). Some aspects of 5G/NR may be based on the 4G Long Term Evolution (LTE) standard. There exists a need for further improvements in 5G/NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Transmissions of uplink data or reference signals from a wireless device to a base station may rely on a "grant-based" protocol in which a wireless device requests a resource grant from the base station when the user equipment has data to transmit. For systems such as enhanced Machine Type Communication (eMTC) or Narrowband IoT (NB-IoT) deploying 5G/NR technology, there may be a large number of wireless devices each transmitting a short burst of data. Requiring a scheduling request to acquire resource grants for each short-burst data transmission from a large number of devices places a load on transmission resources and uses added power at each of the devices. Aspects presented herein improve the transmission efficiency and power consumption of uplink data transmissions, e.g., for devices deploying 5G/NR technology.

Wireless devices in multiple-access technologies share system resources. To access shared resources, wireless devices employing legacy uplink (UL) data transmissions in 5G/NR may use a 4-step UL random access procedure to request the shared resources from a base station when the wireless device has data to transmit. The base station may receive scheduling requests from multiple wireless devices, and may allocate and grant system resources including spectrum resources among the wireless devices, allowing data transmission in a fifth message. To reduce the scheduling overhead, 5G/NR adopts a feature termed Early Data Transmission (EDT) that specifies support for a 2-step UL access procedure, enabling data transmission in a third message. However, both the legacy 4-step UL random access procedure and the 2-step UL access procedure are "grant-based" procedures that rely on the base station granting the resources requested by the wireless devices.

In enhanced Machine Type Communication (eMTC) systems or Narrowband IoT (NB-IoT) deploying 5G/NR technology, there may be a large number of wireless devices where each device transmits a short burst of data relatively infrequently. Requiring a scheduling request to acquire resource grants each time one of a large number of wireless devices needs to transmit short bursts of data is inefficient and wastes power. To improve UL transmission efficiency and power consumption, a wireless device may transmit data and reference signals in a "grant-free" manner. As presented herein, wireless devices with a valid timing advance (TA) (e.g., stationary wireless devices) may receive pre-configured UL resources in a grant-free approach for use in transmitting UL data or reference signals in a first message of a random access procedure. A wireless device may determine and verify the validity of TA information based on DL reference signals (e.g., cell specific reference signals (CRS), radio resource management (RRM), reference signal time difference (RSTD)) or GPS.

The pre-configured UL resources may be targeted for use by wireless devices operating in an idle mode. The pre-configured UL resources may be contention-based resources or contention-free resources and may be used to transmit data or reference signals such as demodulation reference signals (DM-RS). Contention-based resources may be shared by multiple wireless devices. The base station may configure wireless devices sharing contention-based resources to transmit using a multiplexing scheme in the time, frequency, or code-domains to enable multiple access by wireless devices. Resources may be configured separately for UL data and DM-RS. The first few symbols of a subframe may be allocated to DM-RS, known as "front-loaded" DM-RS. In one aspect, resources for the data and resources for the DM-RS may have implicit or explicit linkages. A wireless device may transmit using one or more of the configured multiplexing schemes on the contention-based resources in an orthogonal or in a non-orthogonal manner. In one aspect, the base station may pre-configure a first set of UL resources for a first transmission and a second set of UL resources for a potential retransmission if the first transmission fails.

In an aspect of the disclosure, a method, a computer-readable medium, and an apparatus for using pre-configured UL resources to transmit data in a first message of a random access procedure are provided. In certain configurations, the apparatus may be a user equipment (UE). An example apparatus transmits, to a base station, a capability of the UE to transmit data in a first message of a random access procedure. The example apparatus also receives pre-configured uplink (UL) resources from the base station. The example apparatus also transmits data in the first message of the random access procedure using the pre-configured UL resources.

In an aspect of the disclosure, a method, a computer-readable medium, and an apparatus for pre-configuring UL resources for use by UEs to transmit data in a first message of a random access procedure are provided. In certain configurations, the apparatus may be a base station. An example apparatus receives a capability of one or more user equipment (UEs) indicating that respective UEs are capable of transmitting data in a first message of a random access procedure. The example apparatus also allocates pre-configured uplink (UL) resources for the one or more UEs. The example apparatus also transmits the pre-configured UL resources to the one or more UEs. The example apparatus also receives data in a first message of a random access procedure on the pre-configured UL resources from the one or more UEs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
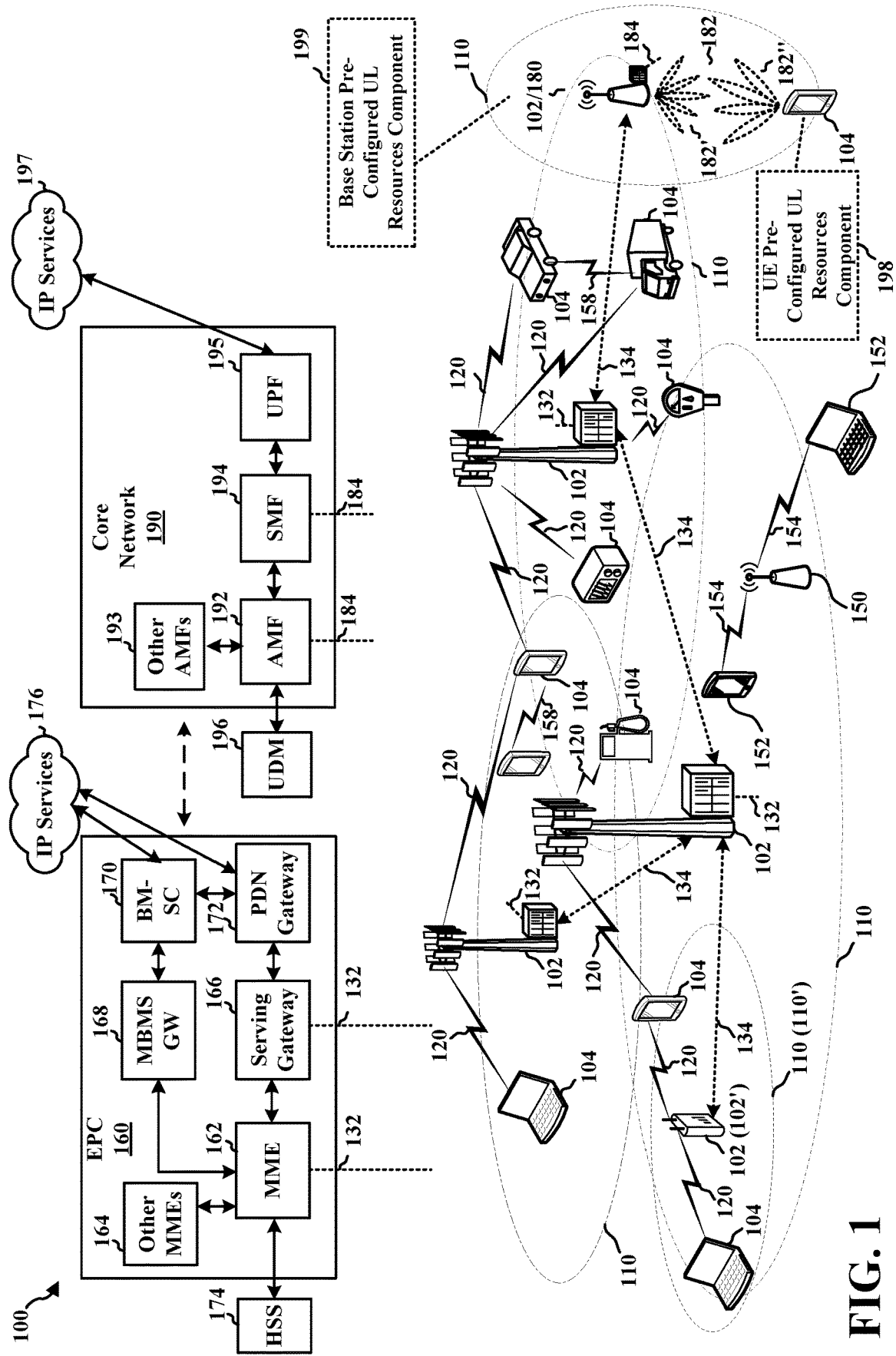
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, the term computer-readable medium is expressly defined to include any type of computer readable storage device and/or storage disk and to exclude propagating signals and to exclude transmission media. As used herein, "computer-readable medium," "machine-readable medium," "computer-readable memory," and "machine-readable memory" are used interchangeably.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G/NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The base station 102/180 may configure the UE 104 with UL resources for transmission of data (e.g., data and/or reference signals) in a first message of a random access procedure. In some examples, the UE 104 may use a last, valid timing advance from a previous random access procedure to transmit the first random access procedure message comprising the data using the pre-configured UL resources. The pre-configured UL resources may be contention-based resources to be shared by the UE 104 and other UEs, or may be contention-free resources reserved for use by the UE 104. The base station 102/180 may allocate contention-based resources or contention-free resources as a function of the number of UEs in a cell, the coverage area of the cell, the potential for interference by the UEs in a cell, the potential for inter-cell interference, etc. For example, the base station 102/180 may allocate contention-based resources when there is a large number of UEs in the coverage area, and may allocate resources for potential retransmissions when an initial UL transmission is not received by the base station 102/180 due to collided transmissions from multiple UEs. To mitigate the probability of collisions, the base station 102/180 may configure the UE 104 with a multiplexing scheme in the time, frequency, or code-domains that the UE 104 may use when transmitting on contention-based resources. The base station 102/180 may configure the UE 104 with separate UL resources for data and reference signals such as demodulation reference signals (DM-RS). In one aspect, the base station 102/180 may allocate the resources periodically for the UE 104 that is in idle mode. In another aspect, the base station 102/180 may allocate the resources aperiodically for a UE that is in connected mode and thus may monitor downlink control information in PDCCH. The base station 102/180 may trigger the UE in the connected mode to use the grant-free pre-configured UL resources so that the UE may bypass the usual scheduling-request based procedure to acquire resource grants.

The UE 104 may be operating in an idle mode in which the UE 104 does not maintain an active connection with the base station 102/180. When the UE 104 has data to transmit, the UE 104 may use the pre-configured resources to transmit the data (e.g., DM-RS and/or data) in a first message of a random access procedure. In some examples, the UE 104 may use a last, valid timing advance from a previous random access procedure to transmit the first random access procedure message comprising the data using the pre-configured resources. The pre-configured resources for the UE 104 may include granularity of the resources allocated, the number of repetitions of the resources such as the number of subframes configured, the periodicity of the resources, an indication of a frequency-hopping pattern for use across repetitions/subframes of the resources, an indication of the potential transport block sizes that may be used by the UE 104, an indication of the power control to be used by the UE 104, an indication of DM-RS sequences and associated DM-RS resource locations in time and frequency that may be used by an UE for transmission, a multiplexing scheme to be used for transmitting on contention-based resources, etc. The multiplexing scheme may be in the time, frequency, or code-domains. For example, the multiplexing scheme may include the use of frequency-domain comb patterns across subcarriers in a symbol, the use of cover codes across symbols or subframes, the use of cyclic shifts of orthogonal sequences across subcarrier, symbols or subframes, or the use of hybrid automatic repeat request (HARQ) redundancy version (RV) index patterns across subframes. The UE 104 may transmit using one or more of the configured multiplexing schemes on the contention-based resources in an orthogonal or in a non-orthogonal manner. In one aspect, the UE 104 may transmit on the contention-based resources without using any of the configured multiplexing scheme and rely on the base station 102/180 to recover the transmitted data from collided transmissions from multiple UEs. In one aspect, the UE 104 may receive pre-configured resources in a "multi-step" basis in which a first set of resources may be pre-configured for a first transmission, and a second set of resources may be pre-configured for a potential retransmission if the base station does not receive the first transmission.

Referring again to FIG. 1, in certain aspects, the UE 104 may be configured to manage one or more aspects of wireless communication via using pre-configured UL resources for transmitting data in a first message of a random access procedure. For example, in the example of FIG. 1, the UE 104 may include a UE pre-configured UL resources component 198 configured to transmit, to a base station, a capability of the UE to transmit data in a first message of a random access procedure. The example UE pre-configured UL resources component 198 may also be configured to receive pre-configured UL resources from the base station. The example UE pre-configured UL resources component 198 may also be configured to transmit data in the first message of the random access procedure using the pre-configured UL resources.

Still referring to FIG. 1, in certain aspects, the base station 102/180 may be configured to manage one or more aspects of wireless communication by enabling a UE to transmit data in a first message of a random access procedure using pre-configured UL resources. For example, in the example of FIG. 1, the base station 102/180 may include a base station pre-configured UL resource component 199 configured to receive capability information of one or more UEs that the respective UE is capable of transmitting data in a first message of a random access procedure. The base station pre-configured UL resource component 199 may also be configured to allocate pre-configured UL resources for the one or more UEs. The base station pre-configured UL resource component 199 may also be configured to transmit the pre-configured UL resources to the one or more UEs. The base station pre-configured UL resource component 199 may also be configured to receive data in a first message of a random access procedure on the pre-configured UL resources from the one or more UEs.

Although the following description may be focused on 5G/NR, the concepts described herein may be applicable to other similar areas, such as LTE, LTE-A, CDMA, GSM, and/or other wireless technologies, in which a WUS resource may conflict with a dedicated resource associated with the UE or a system resource (e.g., a shared resource) associated with a plurality of UEs.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and 2µ slots/subframe. The subcarrier spacing and symbol length/duration are a function of the numerology. The subcarrier spacing may be equal to $2^\mu * 15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A to 2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
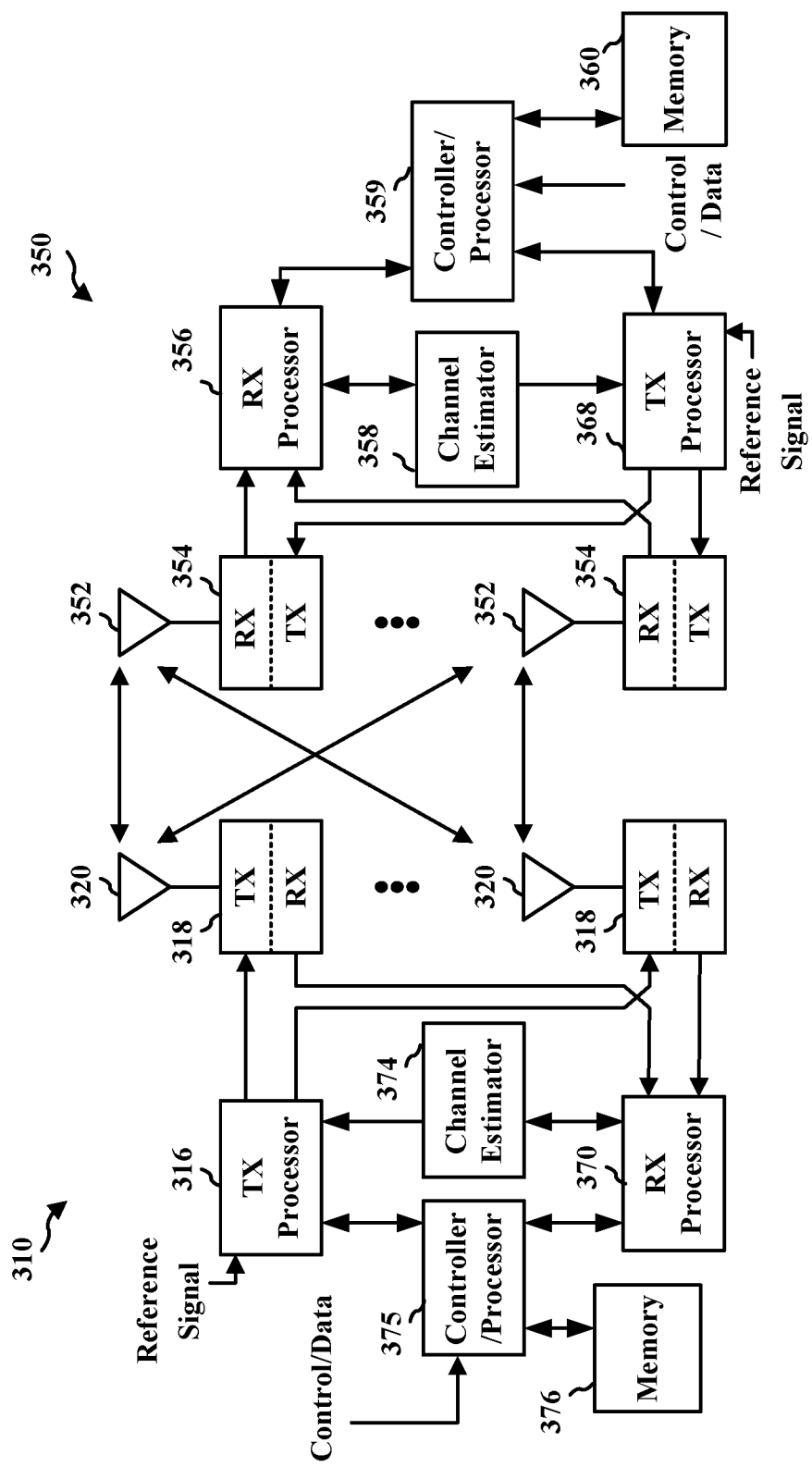
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 of the UE 350 may be configured to perform aspects in connection with the UE pre-configured UL resources component 198 of FIG. 1.

At least one of the TX processor 316, the RX processor 370, and the controller/processor 375 may be configured to perform aspects in connection with the base station pre-configured UL resources component 199 of FIG. 1.

Figure 4:
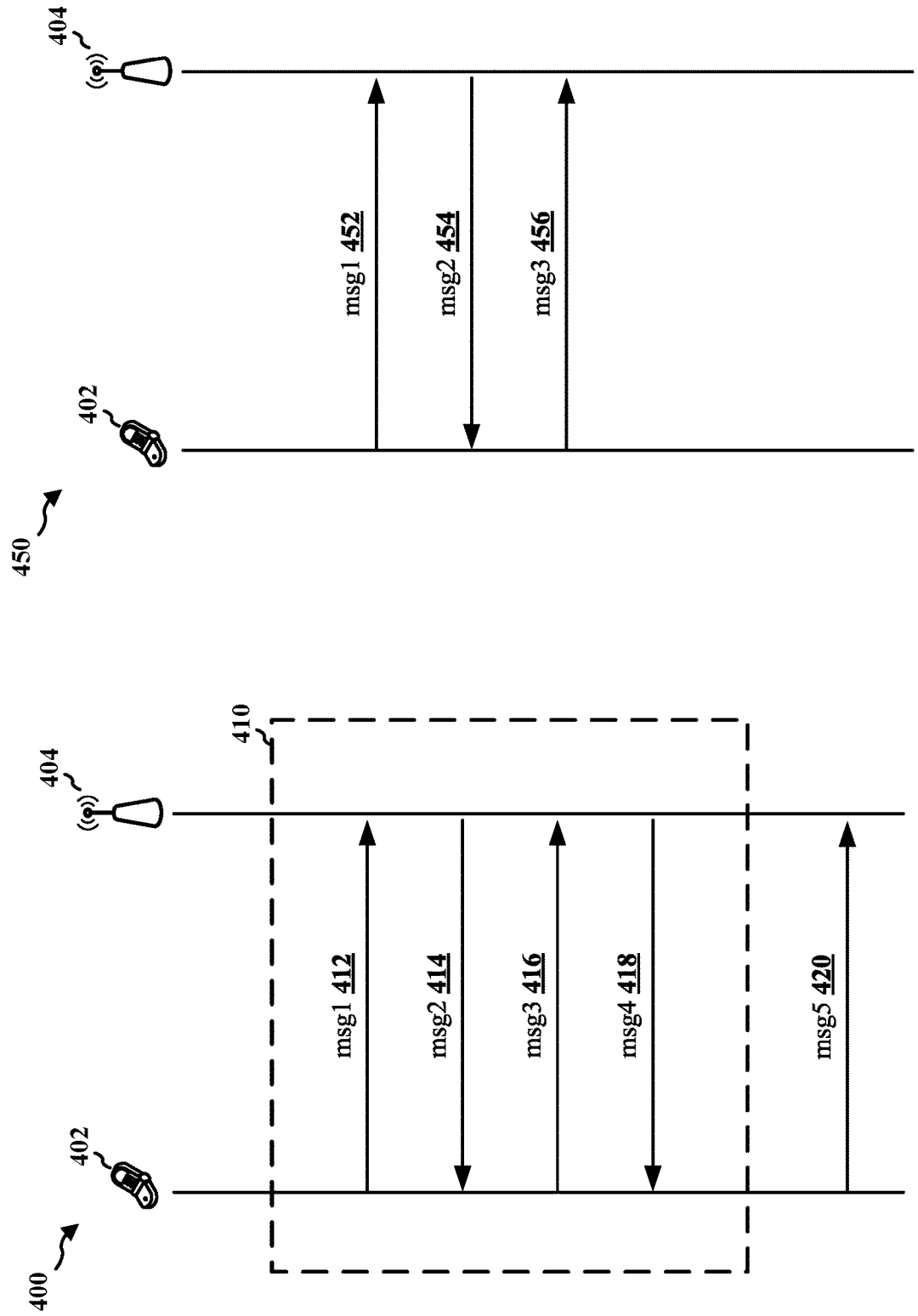
FIG. 4A is a diagram illustrating a call flow diagram between a UE and a base station implementing a four-step random access procedure.
FIG. 4B is a diagram illustrating a call flow diagram between a UE and a base station implementing a two-step random access procedure.

FIG. 4A is a diagram illustrating a call flow diagram 400 between a UE 402 and a base station 404 implementing a four-step random access procedure 410 (sometimes referred to as a random access channel (RACH) procedure). Aspects of the UE 402 may be described with respect to the UE 104 of FIG. 1 and/or the UE 350 of FIG. 3. Aspects of the base station 404 may be described with respect to the base station 102 of FIG. 1, the gNB 180 of FIG. 1, and/or the base station 310 of FIG. 3.

In the illustrated example of FIG. 4A, the four-step random access procedure 410 includes the exchange of four messages. Specifically, the UE 402 may initiate the message exchange of the four-step random access procedure 410 by sending, to the base station 404, a first random access message 412 including a preamble. The base station 404 then sends, to the UE 402, a second random access response message 414 including a random access response (RAR). In certain aspects, the second random access response message 414 may include an identifier of the RACH preamble, a timing advance (TA), an uplink grant for the UE 402 to transmit data, cell radio network temporary identifier (C-RNTI), and/or a back-off indicator. The UE 402 then sends a third random access message 416 to the base station 404. In certain aspects, the third random access message 416 may include RRC connection request, an RRC connection re-establishment request, or an RRC connection resume request, depending on the trigger for the UE 402 initiating the random access procedure. The base station 404 then completes the four-step random access procedure 410 by sending a fourth random access response message 418 to the UE 402. In certain aspects, the fourth random access response message 418 includes timing advancement information, contention resolution information, and/or RRC connection setup information. In certain aspects, the first random access message 412 may be referred to as "msg1," the second random access response message 414 may be referred to as "msg2," the third random access message 416 may be referred to as "msg3," and the fourth random access response message 418 may be referred to as "msg4."

Although not shown, it should be appreciated that in certain aspects, the UE 402 may re-transmit a random access message. For example, in certain aspects, after transmitting the msg1 412, the UE 402 may re-transmit (e.g., periodically, aperiodically, and/or as a one-time event) the msg1 412 until the msg2 414 is received from the base station 404 and/or a timer expires. In other examples, the random access response message received by the UE 402 may indicate that the base station 404 was unable to process (e.g., decode) at least a portion of the random access message. In certain such examples, the UE 402 may then re-transmit the corresponding random access message.

As shown in the example of FIG. 4A, the UE 402 may wait until the four-step random access procedure 410 is complete before sending data (e.g., data and/or DM-RS) in, for example, a fifth message 420 ("msg5"). Example techniques disclosed herein enable the UE 402 to transmit data (e.g., data and/or DM-RS) in a first random access procedure message (e.g., the example msg1 412 of the four-step random access procedure 410). FIG. 4B illustrates an example 450 of two-step RACH, in which the data may be sent in a third random access message 456 following transmission of a preamble by the UE in a first random access message 452 and receipt of a RAR in a second random access message 454 from the base station.

Figure 5:
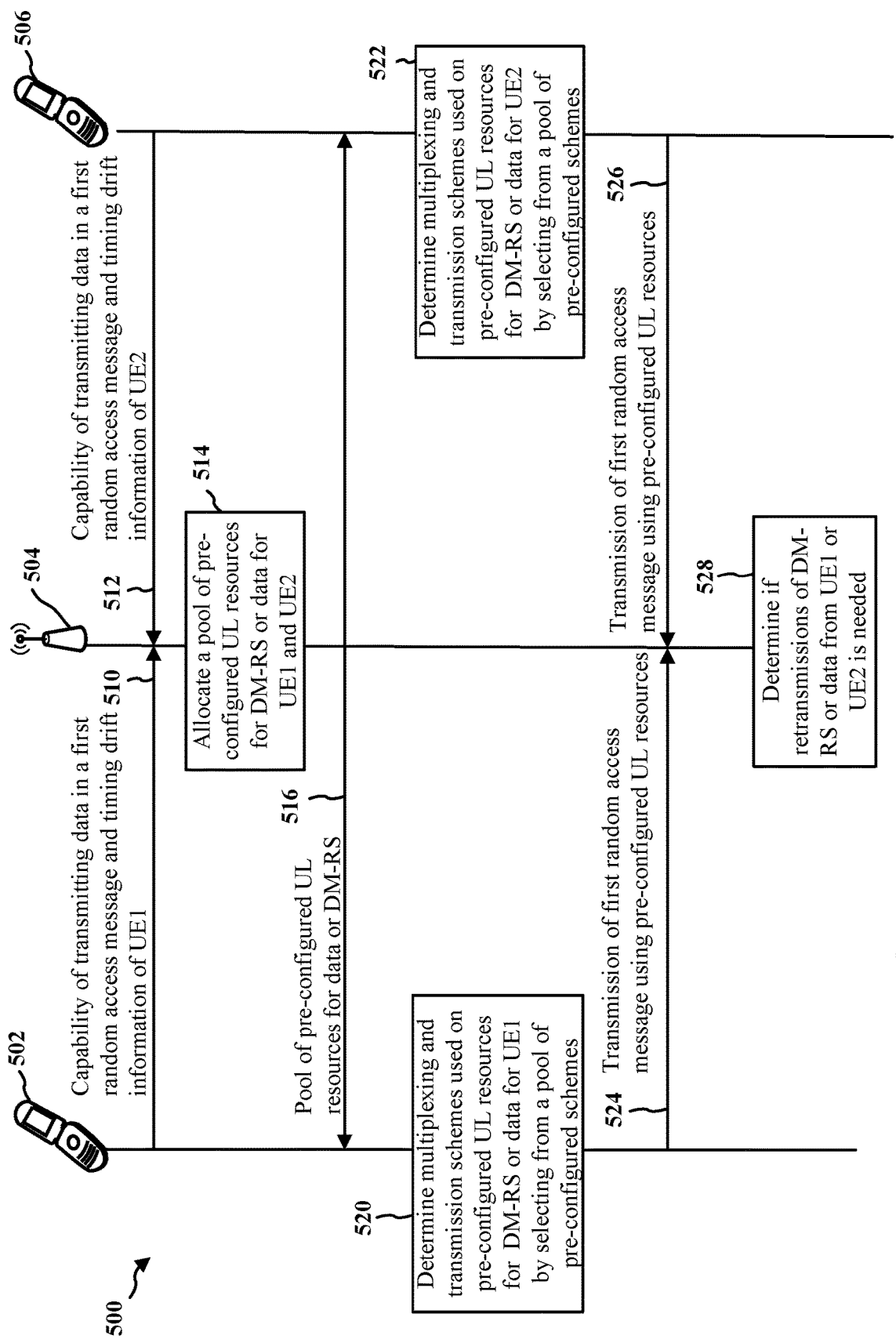
FIG. 5 is a call flow diagram illustrating an implementation of communication between two UEs and a base station when the base station allocates and the UEs receive pre-configured contention-based UL resources for data, and the UEs use a multiplexing scheme on the pre-configured contention-based UL resources for their respective transmissions of data in a first message of a random access procedure, in accordance with certain aspects of the disclosure.

FIG. 5 is a call flow diagram 500 illustrating an implementation of communication between two UEs (e.g., UE1 502 and UE2 506) and a base station 504 when the base station 504 allocates and the UEs 502, 506 receive pre-configured contention-based UL resources for DM-RS or data, and the UEs 502, 506 use a multiplexing scheme on the pre-configured contention-based UL resources for their respective transmissions of data in a first message of a random access procedure, in accordance with certain aspects of the disclosure.

The UE1 502 and/or the UE2 506 may transmit capability information 510 or 512, respectively, to the base station 504 to inform the base station 504 that the UEs 502, 506 may support data transmission in a first message of a random access procedure (e.g., similar to the msg1 412 of FIG. 4A or the msg1 452 of FIG. 4B). The UEs 502, 506 may be operating in an idle mode. In one aspect, to enable the base station 504 to allocate pre-configured UL resources, the UE1 502 or the UE2 506 may transmit an indication of their timing drifts to the base station 504 to indicate how the clock of the UEs may drift over time to help the base station to schedule resources for the first random access procedure message.

At 514, the base station 504 may allocate pre-configured UL resources for DM-RS or data for the UE1 502 and UE2 506. The base station 504 may allocate a set of pre-configured UL resource that may be used by the UE1 502, UE2 506, or other UEs. The pre-configured UL resources may be contention-based resources to be shared by the UE1 502 and UE2 506, or may be contention-free resources reserved for use by the UE1 502 or the UE2 506. In one aspect, the pre-configured UL resources for a UE may be partially contention-based. For example, there may be N UEs in a cell region served by the base station 504 and there may be M resource sets, where 1<M<N. In another example, the base station 504 may allocate K>1 resource sets for each of the N UEs. The K resource sets for the N UEs may partially overlap, for example over a time window, and, thus, may be partially contention-based. The base station 504 may allocate contention-based resources or contention-free resources as a function of the number of UEs in a cell, the coverage area of the cell, the potential for interference by the UEs in a cell, the potential for inter-cell interference, etc. For example, the base station 504 may allocate contention-based resources or contention-free resources as a function of the probability distribution of timing drifts based on the timing drift information received from the UEs. In one aspect, to decrease the probability of collided transmissions from multiple UEs, the base station 504 may group the UEs by interval timing drifts. Because UEs from different interval groups are less likely to transmit at the same time, the base station 504 may allocate contention-free or partially contention-based UL resources for these UEs.

In one aspect, the base station 504 may allocate the UL resources to minimize inter-cell interference between adjacent cells. For example, the base station 504 may allocate UL resources for the UEs in the cell served by the base station 504 so that the UL resources allocated for the UEs in the cell do not overlap, or may partially overlap, with the UL resources allocated for the UEs in an adjacent cell.

In one aspect, the base station 504 may allocate the UL resources as a function of the desired range of the cell coverage, known as the coverage extension (CE) level. For example, to extend coverage to a UE located at the fringe of the coverage area, the base station 504 may allocate a number of repetitions of a set of resources, such as repeating a set of resource allocations across a number of subframes. In one aspect, among the total resources configured by the base station 504 for the first random access procedure message comprising data, some resources may be configured with a relatively smaller number of repetitions to be used by, for example, UEs with good coverage, while other resources may be configured with a relatively larger number of repetitions to be used by, for example, UEs with poor coverage. This flexibility in resource allocation may allow UEs with varying levels of coverage within the cell to satisfy their bandwidth requirements. In one aspect, the base station 504 may specify the periodicity of the configured resources so that the same pattern of resource allocation may repeat for a UE with the specified periodicity across multiple frames. The UE may use the repeated subframes or the periodically repeated pattern of allocated resources to transmit the same data to increase the signal to noise ratio of the data received by the base station 504.

In one aspect, the base station 504 may allocate the UL resources so that they overlap, partially or wholly, with resources allocated for legacy channels. For example, the allocated grant-free UL resources may overlap partially with legacy PRACH resources used for transmitting PRACH preambles. The base station 504 may try to recover data received on the pre-configured UL resources from the interference of the data of the overlapping legacy resources. For example, the base station 504 may invoke matched filtering or multiuser-MIMO (MU-MIMO) detection with minimum mean square error (MMSE) to recover the data on the grant-free UL resources.

In one aspect, the base station 504 may allocate the UL resources for a UE on a "multi-step" basis in which the base station 504 may allocate a first set of resources for a first transmission, and may allocate a second set, and maybe more sets of resources, for potential retransmissions if the base station does not receive the first transmission. The second set, or any subsequent sets, of resources may have a larger allocation than that of the first set, or earlier sets. For example, the later sets of resources may have a larger number of repetitions (e.g., more subframes) to increase the coverage extension level. The UE may receive an indication from the base station 504 when the first transmission is not received, such as when the first transmission collides with transmission(s) from other UEs or when the first transmission has a tight link budget. The UE may retransmit using the second set of resources (or subsequent sets) with increasing larger resource allocation until the transmission is received by the base station 504.

In one aspect, the base station 504 may specify the granularity of the allocated UL resources. For example, the base station 504 may allocate the UL resources at the PRB level, at the sub-PRB level, or at a higher level than the PRB. As an example, the base station 504 may allocate at a narrowband level at a granularity of 6 contiguous PRBs for eMTC. In another example, the base station 504 may allocate carriers at the PRB level for NB-IoT.

In one aspect, the base station 504 may allocate separate UL resources for DM-RS and data. For example, the base station 504 may allocate the first few symbols of a subframe to DM-RS, referred to as a "front-loaded" DM-RS allocation. The base station 504 may configure additional resources for DM-RS in non-front-loaded positions. In one aspect, the format of DM-RS resources within a subframe may partially be defined separately a priori. The same front-loaded DM-RS resources may be allocated to multiple UEs as a contention-based allocation. A UE may transmit DM-RS using one or more of configured multiplexing schemes on the contention-based front-loaded DM-RS resources in an orthogonal or in a non-orthogonal manner. In one aspect, the base station 504 may allocate the UL resources for the DM-RS to have a different bandwidth from that of the UL resources for the data. For example, the front-loaded DM-RS resources may have a different bandwidth than the bandwidth of the UL resources allocated for the data. In one aspect, UL resources allocated for the data and for the DM-RS may have implicit or explicit linkages. The linkages may be determined based on one or more of the DM-RS sequences, DM-RS multiplexing patterns, or DMRS resource locations in time and frequency.

Figure 6A:
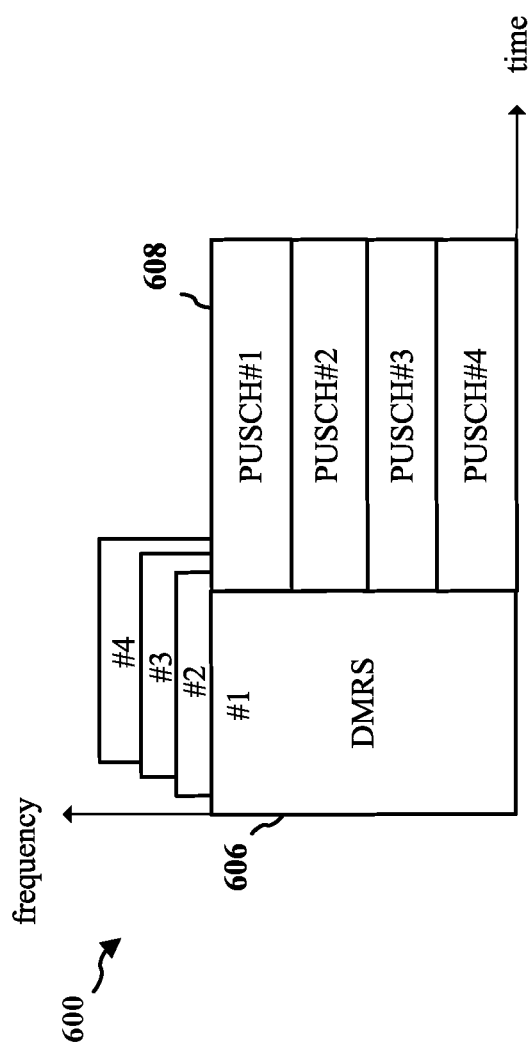
FIG. 6A and FIG. 6B illustrate a linkage between the pre-configured resources for DM-RS and data where the data has multiplexed resources indicated by the corresponding DM-RS resource and sequence in accordance with certain aspects of the disclosure.
Figure 6B:
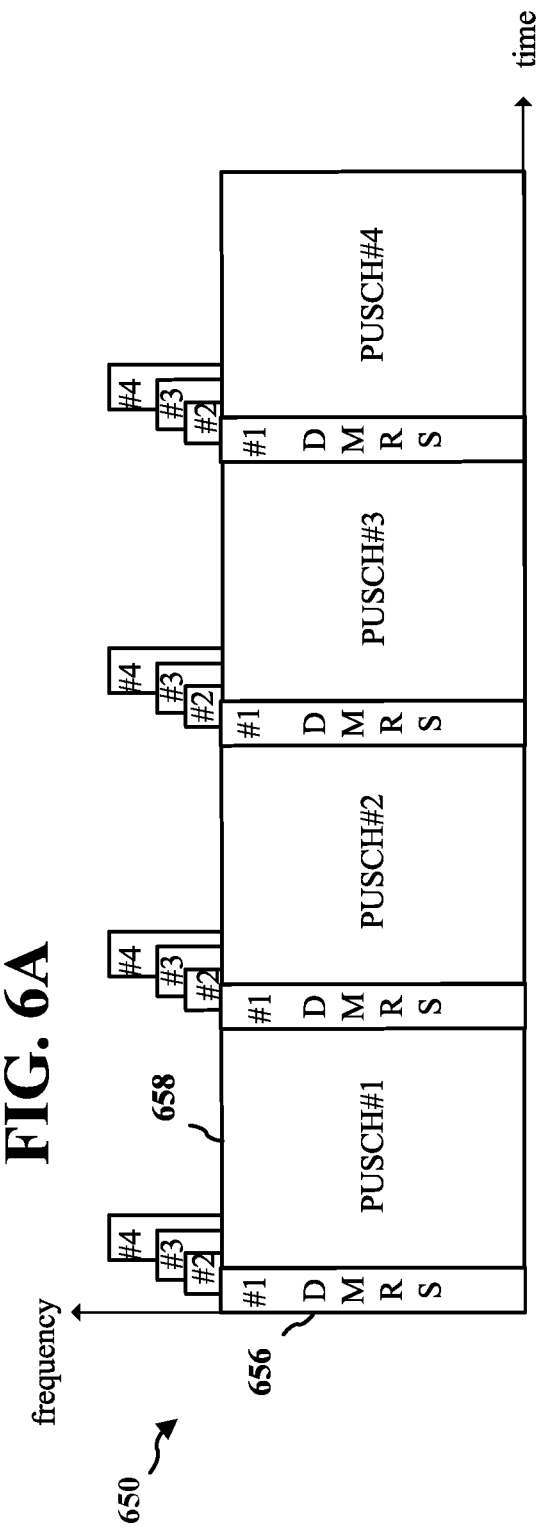

FIG. 6A and FIG. 6B illustrate a linkage between the pre-configured resources for DM-RS and data where the data has multiplexed resources indicated by the corresponding DM-RS resource and sequences in accordance with certain aspects of the disclosure. FIG. 6A illustrates an example UL resource allocation 606 for a front-loaded DM-RS and an example UL resource allocation 608 for data on PUSCH for four UEs. In this example, the DM-RS resources are shared by four configured DM-RS sequences, possibly using time, frequency or code domain multiplexing to distinguish among their identities. The UL resource allocation 608 for the data may be frequency division multiplexed (FDM) among the four UEs. In some examples, the resources allocated for the DM-RS and the resources allocated for the data may be linked. The linkage of the resources for a UE may be determined by one or more of the DM-RS sequence used by the UE, the DM-RS multiplexing pattern used by the UE, or the DM-RS resource location in time and frequency used by the UE. For example, the DM-RS sequence #1 may be linked to the set of subcarriers for PUSCH resource #1. Similarly, the DM-RS sequences #2, #3, and #4 may be linked to the sets of subcarriers for PUSCH resource #2, PUSCH resource #3, and PUSCH resource #4, respectively. As shown, the bandwidth of the resource allocated for DM-RS may be larger than the bandwidth of the resource allocated for data for a UE.

FIG. 6B illustrates another example UL resource allocation 656 for a front-loaded DM-RS and an example UL resource allocation 658 for data on PUSCH for four UEs. As in FIG. 6A, in this example of FIG. 6B, the DM-RS resources are shared by four configured DM-RS sequences, possibly using time, frequency or code domain multiplexing to distinguish among their identities. The UL resource allocation 658 for the data may be time division multiplexed (TDM) among the four UEs. The DM-RS sequence used by UE #1 may be linked to the resources in PUSCH #1 for UE #1 immediately following the front-loaded DM-RS. Similarly, the DM-RS sequences used by UE #2, #3, and #4 may be linked to the resources in PUSCH #2, PUSCH #3, and PUSCH #4 for UE #2, UE #3, and UE #4 immediately following their respective front-loaded DM-RS.

Other possible linkage configurations may additionally or alternatively be allowed. For example, different DMRS sequences corresponding to different UEs may be linked to the same physical locations in time and frequency for data transmission. That is, the data resources may be contention-based, as opposed to FDM or TDM as in FIG. 6A and FIG. 6B.

Referring back to 514 in FIG. 5, in one aspect, the UL resource allocation may include a number of repetitions of one or more subsets of the UL resources, and a periodicity of one or more subsets of the UL resources so that the same pattern of resource allocation may repeat for a UE with the specified periodicity across multiple frames. The number of repetitions or the periodicity may depend on the CE level desired in the network. As mentioned above, to extend coverage to a UE located at the fringe of the coverage area, the base station 604 may allocate a number of repetitions of a set of resources, such as repeating a set of resource allocation across a number of subframes, or may specify a periodicity of the repeated subframes. In one aspect, among the total resources configured by the base station 504 for transmissions of data in a first random access procedure message, some resources may be configured with a smaller number of repetitions, for example to be used by UEs with good coverage, while other resources may be configured with a larger number of repetitions to be used by, for example, UEs with poor coverage. This flexibility in resource allocation allows UEs with varying levels of coverage within the cell to satisfy their bandwidth requirements. A UE may use the repeated subframes or the periodically repeated pattern of the repeated subframes to transmit the same data to increase the signal to noise ratio of the data received by the base station 504.

In one aspect, the UL resource allocation may include an indication of a frequency-domain hopping pattern across repetitions or subframes in one or more subsets of the UL resources. The UL resource allocation may include a hopping enable/disable indication to enable a UE to transmit data or DM-RS using the frequency-domain hopping pattern across subframes.

In one aspect, the UL resource allocation may include an indication of potential transport block sizes that may be used by a UE for transmitting data. In one aspect, the UL resource allocation may include an indication of power control used for transmitting or retransmitting DM-RS or data in one or more subsets of the UL resources. For example, the power control may employ different p0/alpha configured by the RRC layer for data transmissions in a first random access procedure message. In another example, the power control may be signaled as an offset from a nominal power level for data transmission in the first random access procedure message (e.g., similar to the msg1 412 of FIG. 4A or the msg1 452 of FIG. 4B). In one aspect, the base station 504 may determine the power level for a UE using a closed-loop control based on the power received at the base station 504 from a previous transmission by the UE. In one aspect, the power control may be a function of the CE level desired in the network such that the base station 504 may configure a UE located at the fringe of the coverage area with a higher power to increase the CE level. In one aspect, the power control used and the power level indicated may be different for data and DM-RS.

In one aspect, the UL resource allocation may include an indication of the multiplexing scheme to be used for transmitting DM-RS and data on contention-based resources. The multiplexing scheme may be in the time, frequency, or code-domains. For example, the multiplexing scheme may include the use of frequency-domain comb patterns across subcarriers in a symbol, the use of cover codes across symbols or subframes, the use of cyclic shifts of orthogonal sequences across subcarriers, symbols, or subframes, or the use of HARQ RV index patterns across subframes. A UE may transmit using one or more of the configured multiplexing schemes on the contention-based resources in an orthogonal or in a non-orthogonal manner. In one aspect, a UE may transmit on the contention-based resources without using any of the configured multiplexing scheme(s) and rely on the base station 504 to recover the transmitted data from collided transmissions from multiple UEs. In one aspect, the degree of orthogonalization indicated by the multiplexing scheme may depend on the number of antennas at the base station 504, the detection capability of the base station 504, and the UE loading or congestion level, or detected collisions in the network. In one aspect, the detection capability of the base station 504 may include how many MU-MIMO streams the base station 504 may decode at a time.

In one aspect, the UL resource allocation may include an indication of the DM-RS sequences and associated DM-RS resource locations in time and frequency that may be used by a UE for transmission, including an appropriate value of related parameters, such as the number of cyclic shifts that are allowed for the DM-RS sequences. In one aspect, the DM-RS sequences and the related parameters may be assigned based in part on the UE identity (UEID). A UE may use the DM-RS sequences, the associated DM-RS resource locations in time and frequency, and the related parameters, such as the number of cyclic shifts, as part of a multiplexing scheme for transmitting the DM-RS on contention-based resources.

In one aspect, the base station 504 may allocate the resources aperiodically for a UE that is operating in a connected mode and, thus, may be monitoring for downlink control information in PDCCH. The base station 504 may trigger the UE in the connected mode to use the pre-configured UL resources for the first random access procedure message. In one aspect, the base station 504 may convey the trigger through DCI. A UE operating in the connected mode may use the pre-configured UL resources for UL transmissions and, thereby, bypass the usual scheduling-request based procedure to acquire resource grants (e.g., as shown in connection with the four-step random access procedure 410 of FIG. 4A or the two-step random access procedure 450 of FIG. 4B).

At 516, the base station 504 may transmit information related to a pool of the pre-configured UL resources for data and DM-RS to UE1 502 and UE2 506. In one aspect, the base station 504 may transmit information related to contention-based UL resources as a broadcast message to UE1 502, UE2 506, and/or other UEs. For example, the base station 504 may broadcast the configuration information as SIB. UEs may use one or more of the multiplexing scheme received as part of the configuration information for transmitting data or DM-RS on the contention-based UL resources. In one aspect, the base station 504 may transmit information related to contention-based or partially contention-based UL resources on a unicast message targeted to the UE1 502 or UE2 506. For example, the base station 504 may transmit the configuration information for a specific UE as a RRC configured unicast message.

At 520, the UE1 502 may receive the configuration information 516 related to the pre-configured UL resources from the base station 504 and may determine the UL resources for DM-RS and data for the UE1 502 from the pool of pre-configured resources, including determining a multiplexing scheme and a transmission scheme for data and DM-RS selected from the pool of pre-configured UL resources. In one aspect, the UE1 502 may determine the multiplexing scheme for transmitting the data and DM-RS if the pre-configured UL resources are contention-based. Similarly, at 522, the UE2 506 may receive the configuration information 516 related to the pre-configured UL resources from the base station 504 and may determine the UL resources for DM-RS and data for the UE2 506 from the pool of pre-configured resources, including determining a transmission scheme and a multiplexing scheme for data and DM-RS selected from the pool of pre-configured UL resources.

In one aspect, the UE1 502 and/or the UE2 506 may receive a multiplexing scheme from the base station 504 as part of the configuration information 516. The multiplexing scheme may be in the time, frequency, or code-domains. For example, the multiplexing scheme may include the use of frequency-domain comb patterns across subcarriers in a symbol, the use of cover codes across symbols or subframes, the use of cyclic shifts of orthogonal sequences across subcarriers, symbols, or subframes, or the use of HARQ RV index patterns across subframes.

In one aspect, the UE1 502 and/or the UE2 506 may select a cover code, or an orthogonal cover code (OCC) from a configured set of cover codes or OCCs for transmitting data across symbols on contention-based UL resources using code-multiplexing. For example, the UE1 502 and/or the UE2 506 may apply a respective OCC selected from an orthogonal set to a small blocks of symbols repeated over a subframe. The base station 504 may recover the data from the UE1 502 and/or the UE2 506 by correlating the received multiplexed data with the corresponding OCC code applied by the UE1 502 or the UE2 506. Transmitting a repeated set of symbols covered with an OCC may reduce the data throughput, but may also improve interference management and reliability, and may extend the CE level. In one aspect, the UE1 502 and/or the UE2 506 may apply the OCC to data that has a low transport block size or has a low modulation and coding scheme (MCS) setting.

In one aspect, the UE1 502 and/or the UE2 506 may select a frequency-domain comb pattern of subcarriers in a symbol from a set of possible comb-patterns configured for transmitting data on contention-based UL resources. For example, the UE1 502 may transmit data on the even subcarriers of a symbol and the UE2 506 may transmit data on the odd subcarriers of the same symbol. The base station 504 may recover the data from the UE1 502 and/or the UE2 506 by extracting the data from the even subcarriers or the odd subcarriers, respectively, of a symbol. In one aspect, the UEs may apply a comb pattern with a comb offsets across symbols.

In one aspect, the UE1 502 and/or the UE2 506 may transmit data on contention-based UL resources without using any multiplexing in the time, frequency, or code-domains and may rely on the base station 504 to recover the transmitted data from collided transmission from multiple UEs. The base station 504 may attempt to recover data from collided transmissions from multiple UEs. For example, the base station 504 may invoke MU-MIMO detection with minimum mean square error (MMSE), to recover the data from the collided transmissions.

In one aspect, the UE1 502 and/or the UE2 506 may combine one or more of the code-multiplexing technique using OCC, the frequency-multiplexing technique using the comb patterns, or the collision-based technique when transmitting data on contention-based UL resources. In one aspect, the UE1 502 and/or the UE2 506 may transmit data on the contention-based UL resources in a quasi-orthogonal manner. In one aspect, the degree of orthogonalization may depend on the number of antennas at the base station 504, the detection capability of the base station 504, and the UE loading or congestion level, or detected collisions in the network. In one aspect, the detection capability of the base station 504 may include how many MU-MIMO streams the base station 504 may decode at a time. The UEs may rely on the base station 504 to recover the DM-RS from collided transmissions from multiple UEs using matched filtering or MU-MIMO with MMSE detection.

Figure 7:
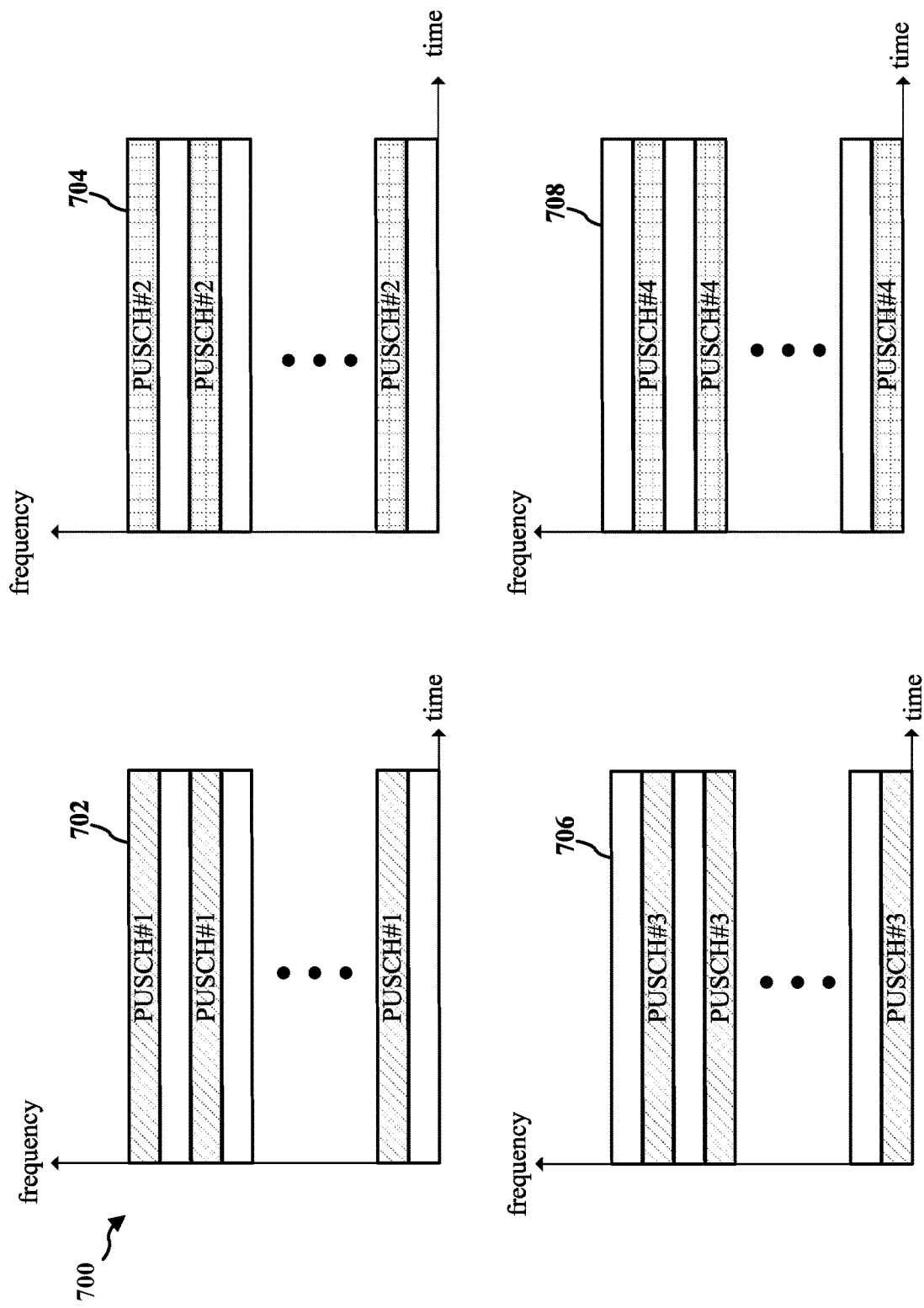
FIG. 7 illustrates a combination of frequency-domain and code-domain multiplexing schemes for transmitting data in pre-configured contention-based resources from four UEs in accordance with certain aspects of the disclosure.

FIG. 7 illustrates a combination of frequency-domain and code-domain multiplexing schemes 700 for transmitting data in pre-configured contention-based resources from four UEs in accordance with certain aspects of the disclosure. UE #1, UE #2, UE #3, and UE #4 use resources PUSCH #1, PUSCH #2, PUSCH #3, and PUSCH #4, respectively, for transmitting data. For frequency division multiplexing (FDM) of the resources, UE #1 and UE #2 may use the even subcarriers in a comb pattern, and UE #3 and UE #4 may use the odd subcarriers in a comb pattern. For code division multiplexing (CDM) of the resources, UE #1 and UE #3 may use a first OCC pattern, and UE #2 and UE #4 may use a second OCC pattern. The four PUSCHs may be, thus, multiplexed to share the contention-based resources using a combination of FDM and CDM techniques.

In another example, the four PUSCHs may use the FDM technique but not the CDM technique to share the contention-based resources. For example, UE #1 and UE #2 may use the even subcarriers in a comb pattern and UE #3 and UE #4 may use the odd subcarriers in a comb pattern. However, the four UEs may not multiplex using OCC. As such, data transmissions from UE #1 and UE #2 may collide and transmissions from UE #3 and UE #4 may collide. A base station receiving the collided transmissions may invoke matched filtering or MU-MIMO detection with MMSE to recover the data from the UEs.

Referring back to 520 and 522 of FIG. 5, in one aspect, the UE1 502 and/or the UE2 506 may determine a transmission scheme for repeating the transmission of data across subframes of the pre-configured UL resources. In one aspect, the UE1 502 and/or the UE2 506 may receive an indication for the transmission scheme. For example, the UE1 502 and/or the UE2 506 may receive an indication of a frequency-domain hopping pattern across repetitions or subframes in one or more subsets of the UL resources. The UE1 502 and/or the UE2 506 may receive a hopping enable/disable indication. When the hopping indication is enabled, the UE1 502 and/or the UE2 506 may use a configured frequency hopping pattern to transmit data repeated across subframes to increase the probability of successful reception or to increase the CE level.

In one aspect, the UE1 402 and/or the UE2 506 may apply a HARQ RV index pattern across subframes of repeated data when transmitting on the pre-configured UL resources to increase reliability or to increase the CE level. In one aspect, the UE1 502 and/or the UE2 506 may receive an indication of the HARQ RV index pattern to use from the base station 504 as part of the configuration information 516. For example, the base station 504 may specify a pattern of RV indices across subframes configured by the RRC layer or a higher layer. The RV index pattern may depend on the number of repetitions of the subframes configured. In one example, for four repetitions of the subframes, the RV pattern may be [0, 2, 3, 1]. In another example, for eight repetitions of the subframes, the RV pattern may be [0, 0, 2, 2, 3, 3, 1, 1]. In one aspect, the UE1 502 and/or the UE2 506 may apply the same RV across consecutive subframes of repeated data to improve frequency offset estimation.

In one aspect, the UE1 502 and/or the UE2 506 may apply a scrambling sequence, a cover code, or an OCC pattern across subframes of repeated data when transmitting on the pre-configured UL resources to increase reliability or to increase the CE level. For example, the UE1 502 and/or the UE2 506 may apply an OCC selected from a configured set of orthogonal cover codes to data repeated across subframes. In one aspect, the UE1 502 and/or the UE2 506 may receive the cover code to use as part of the multiplexing scheme information of the configuration information 516 received from the base station 504.

In one aspect, similar to how the UE1 502 and/or the UE2 506 may use a combination of time, frequency, or code-domain multiplexing techniques when transmitting data on contention-based UL resources, the UE1 502 and/or the UE2 506 may apply a combination of a frequency-domain hopping pattern, a HARQ RV index pattern, a scrambling sequence, a cover code, or an OCC when transmitting data repeated across subframes on the pre-configured UL resources.

In one aspect, the UE1 502 and/or the UE2 506 may use a time, frequency, code-domain multiplexing and transmission technique, or a combination thereof, when transmitting DM-RS on contention based UL resources. In one aspect, the UE1 502 and/or the UE2 506 may select a multiplexing technique from the multiplexing scheme received from the base station 504. The multiplexing scheme may include the use of frequency-domain comb patterns across subcarriers across symbols or subframes, the use of cover codes across symbols or subframes, or the use of cyclic shifts of orthogonal sequences across subcarrier, symbols or subframes. In one aspect, the UE1 502 and/or the UE2 506 may determine a transmission scheme based on the indications of transmission scheme received from the base station 504. The indications of transmission scheme may include an indication of a frequency-domain hopping pattern across subframes and a hopping enable/disable indication, an indication of the DM-RS sequences that may be used by a UE in pre-configured DM-RS resources, including an appropriate value of related parameters, such as the number of cyclic shifts that are allowed for the DM-RS sequences. In one aspect, the UE1 502 and/or the UE2 506 may determine the multiplexing and the transmission techniques on its own.

In one aspect, the UE1 502 and/or the UE2 506 may determine an orthogonal sequence and a cyclic shift associated with the orthogonal sequence. The UE1 502 and/or the UE2 506 may apply the cyclic shift of the orthogonal sequences in the time domain across symbols, subframes, or subcarriers when transmitting DM-RS on the pre-configured UL resources.

In one aspect, the UE1 502 and/or the UE2 506 may determine and apply a frequency-domain comb pattern of subcarriers in a symbol when transmitting DM-RS on the pre-configured UL resources. For example, the UE1 502 and/or the UE2 506 may transmit DM-RS on the even subcarriers or the odd subcarriers across one or more symbols of a subframe, or across multiple subframes. In one aspect, the UE1 502 and/or the UE2 506 may apply a comb pattern with or without a comb offsets across symbols.

In one aspect, the UE1 502 and/or the UE2 506 may determine and apply a scrambling sequence, a cover code, or an OCC pattern across symbols of a subframe, or across multiple subframes when transmitting DM-RS on the pre-configured UL resources. The OCC may be selected from a configured set of orthogonal cover codes. In one aspect, the scrambling sequence, cover code, or OCC pattern used for transmitting the DM-RS may be related to the sequence or code used for transmitting repeated subframes of data.

In one aspect, the UE1 502 and/or the UE2 506 may determine and apply a frequency-domain hopping pattern across subframes when transmitting DM-RS on the pre-configured UL resources. In one aspect, the UE1 502 and/or the UE2 506 may apply a configured frequency hopping pattern across intra-cell and inter-cell resources when transmitting DM-RS, similar to that used for frequency hopping in the case of sounding reference signal (SRS). In one aspect, the frequency hopping pattern may be related to that used for transmitting repeated subframes of data.

In one aspect, the UE1 502 and/or the UE2 506 may apply a cyclic shift of a DM-RS sequence when transmitting DM-RS on the pre-configured UL resources. In one aspect, the base station 504 may indicate the DM-RS sequences that may be used and the number of cyclic shifts that are allowed for the DM-RS sequences. In one aspect, the DM-RS sequences and DM-RS resource location in time and frequency may determine the linkage of the resource allocated for the data, as discussed in FIG. 6A and FIG. 6B.

In one aspect, the UE1 502 and/or the UE2 506 may transmit DM-RS on the pre-configured UL resources in a non-orthogonal or in a quasi-orthogonal manner. In one aspect, the degree of orthogonalization may depend on the number of antennas at the base station 504, the detection capability of the base station 504, and the UE loading or congestion level, or detected collisions in the network. In one aspect, the detection capability of the base station 504 may include how many MU-MIMO streams the base station 504 may decode at a time. The UEs may rely on the base station 504 to recover the DM-RS from collided transmissions from multiple UEs using matched filtering or MU-MIMO detection with MMSE.

In one aspect, the UE1 502 and/or the UE2 506 may transmit DM-RS on the pre-configured UL resources using a combination of an orthogonal sequence with a cyclic shift, a frequency-domain comb pattern, a scrambling sequence, a cover code, an OCC pattern, a frequency-domain hopping pattern, a DM-RS sequence with a cyclic shift, a non-orthogonal technique, or a quasi-orthogonal technique. The DM-RS or a part of the DM-RS, such as the front-loaded DM-RS, may be decodable independently of the data. In one aspect, the DM-RS or the front-loaded DM-RS may carry UEID information, such as the s-temporary mobile subscriber identity (s-TMSI). The base station 504 may decode the UEID information for use in subsequent procedures.

Figure 8:
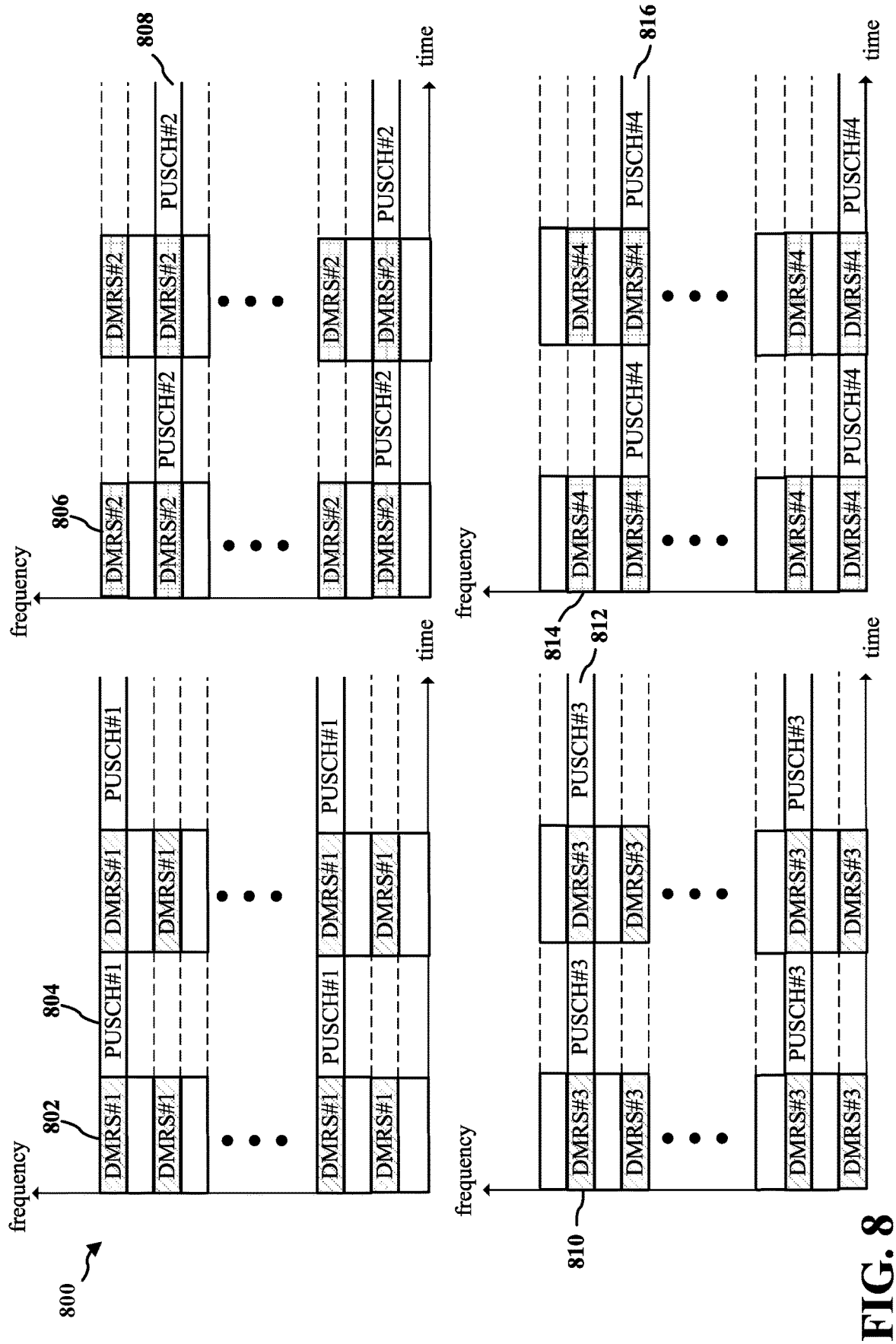
FIG. 8 illustrates different combinations of frequency-domain and code-domain multiplexing schemes for transmitting data and DM-RS in pre-configured contention-based resources from four UEs in accordance with certain aspects of the disclosure.

FIG. 8 illustrates different combinations 800 of frequency-domain and code-domain multiplexing schemes for transmitting data and DM-RS in pre-configured contention-based resources from four UEs in accordance with certain aspects of the disclosure. The resources for the front-loaded DM-RS and data are contention-based resources shared by the four UEs. The four UEs may transmit front-loaded DM-RS using a respective DM-RS sequence and a cyclic shift of the sequence selected from a set configured by a base station on the UL resource allocated using a combination of TDM and CDM techniques. For example, using TDM, UE #1 and UE #2 may transmit DM-RS #1 802 and DM-RS #2 806, respectively, using the even subcarriers of a comb pattern. UE #3 and UE #4 may transmit DM-RS #3 810 and DM-RS #4 814, respectively, using the odd carriers of a comb pattern. Using CDM, UE #1 and UE #3 may use a first OCC pattern, and UE #2 and UE #4 may use a second OCC pattern selected from a set configured by a base station. Using the combination of the TDM and CDM techniques, the four UEs may transmit their DM-RS in an orthogonal manner.

The resources used by the DM-RS and the resources used by the data for each UE may be linked. The linkage of the resources for a UE may be determined by one or more of the DM-RS sequence, DM-RS multiplexing patterns, or DMRS resource locations in time and frequency used by the UE. For example, the DM-RS sequence used for DM-RS #1 802 may be linked to the subcarriers for PUSCH resource #1 804 used by UE #1. Similarly, the DM-RS sequences used for DM-RS #2 806, DM-RS #3 810, and DM-RS #4 814 may be linked to the sets of subcarriers for PUSCH resource #2 808, PUSCH resource #3 812, PUSCH resource #4 816 used by UE #2, UE #3, and UE #4, respectively. The UL resources allocated for the data for the four UEs use different subcarriers of a comb pattern. Using the FDM technique, the four UEs may transmit their data in an orthogonal manner.

Referring back to FIG. 5, at 524, the UE1 502 may transmit the DM-RS and the data on the pre-configured UL resources in a first random access procedure message to the base station using its determined multiplexing and transmission schemes. In some examples, the UE1 502 may use a last, valid timing advance from a previous random access procedure to transmit the first random access procedure message using the pre-configured UL resources. At 526, the UE2 506 may transmit the DM-RS and the data on the pre-configured UL resources in a first random access procedure message to the base station 504 using its determined multiplexing and transmission schemes. In some examples, the UE2 506 may use a last, valid timing advance from a previous random access procedure to transmit the first random access procedure message using the pre-configured UL resources. In one aspect, the DM-RS transmissions from the UE1 502 and the UE 2 506 may be orthogonal, and the data transmission from the UE1 502 and the UE 2 506 may also be orthogonal.

The UE1 502 and/or the UE2 506 may transmit the DM-RS and data using the power control received from the base station 504. For example, the power control may employ different p0/alpha configured by the RRC layer of the base station 504. In another example, the power control may be signaled as an offset from a nominal power level for a first random access procedure message transmission. In one aspect, the power level for a UE may be determined by the base station 504 using a closed-loop control based on the power received at the base station 504 from a previous transmission by the UE1 502 and/or the UE2 506. In one aspect, the power control may be a function of the CE level desired in the network. In one aspect, the power control used may be different for data and DM-RS.

The base station 504 may decode the DM-RS independently of the data. In one aspect, the base station 504 may decode the DM-RS from the UE1 502 and/or the UE2 506 to obtain a UEID information and may use the decoded UEID information for use in subsequent procedures.

At 528, the base station 504 may determine if the DM-RS or the data are received from the UE1 502 or the UE2 506. If there is a failed reception, the base station 504 may configure an additional set of DM-RS or data resources over which the UEs may try to retransmit. For example, if the failure is due to a collision of transmissions, the base station 504 may allocate a larger set of resources, such as a larger bandwidth, to avoid collisions.

In one aspect, the additional set of DM-RS or data resources may already have been allocated in a multi-step basis in which the base station 504 may allocate a first set of resources for a first transmission, and may allocate a second set, and maybe more sets of resources, for potential retransmissions if the base station 504 does not receive the first transmission. The second set, or any subsequent sets, of resources may have a larger allocation than that of the first set, or earlier sets. For example, the later sets of resources may have a larger number of repetitions (e.g., more subframes) to increase the coverage extension level. The UE1 502 and/or the UE2 506 may receive an indication from the base station 504 when the first transmissions are not received, such as when the first transmissions from the UE1 502 and the UE2 506 collide or when the first transmissions have a tight link budget. The UE1 502 and/or the UE2 506 may retransmit using the second set of resources (or subsequent sets) with increasing larger resource allocation until the transmission is received by the base station 504.

In one aspect, the base station 504 may signal a back-off timer or indicator to the UE1 502 and/or the UE2 506 before the next retransmissions for collision avoidance. In one aspect, the base station 504 may signal the UE1 502 and/or the UE2 506 to fall back to EDT or the legacy random access procedure that requires the UE1 502 and/or the UE2 506 to make scheduling requests to acquire resource grants.

Figure 9:
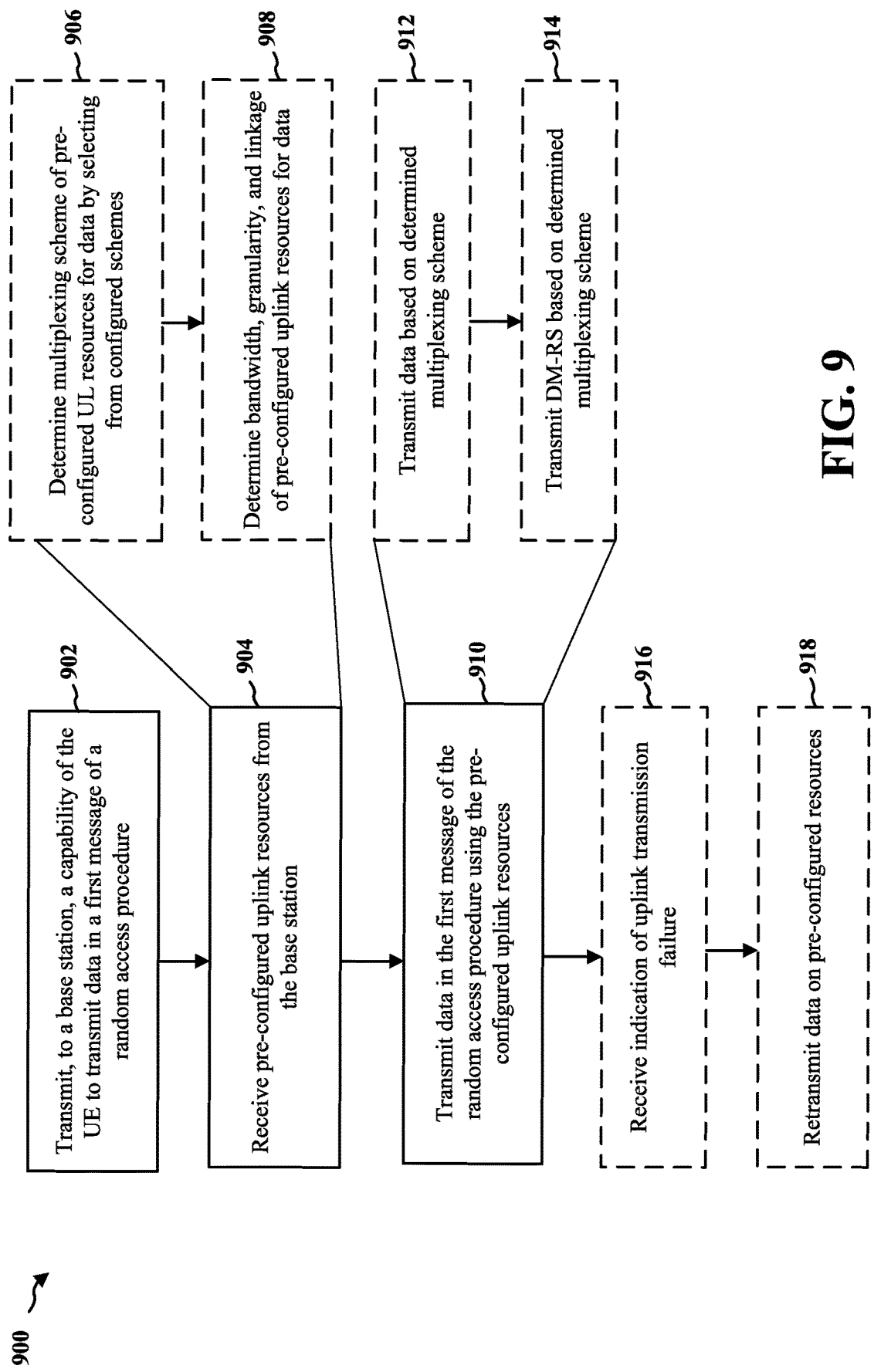
FIG. 9 is a flowchart of a method of wireless communication that may be implemented by a UE in accordance with certain aspects of the disclosure.

FIG. 9 is a flowchart 900 of a method of wireless communication that may be implemented by a UE or a component of a UE (e.g., the UE 104, the UE 350, the UE 402, the UE 502, the UE 506, the apparatus 1002/1002', and/or the processing system 1114, which may include the memory 360 and which may be the entire UE 350 or a component of the UE 350, such as the TX processor 368, the RX processor 356, and/or the controller/processor 359) in accordance with certain aspects of the disclosure. The flowchart 900 of FIG. 9 is a method that facilitates using pre-configured UL resources for transmitting data in a first message of a random access procedure, which may improve the transmission efficiency and/or power consumption of the UE during uplink transmissions. Optional aspects are illustrated with a dashed line.

At 902, the UE may transmit a capability of the UE to transmit data in a first message of a random access procedure to a base station. As the data may be transmitted in the first message of the random access procedure, it is transmitted with a specific grant for the data transmission. For example, a UE capability determination component 1004 of the apparatus 1002 may facilitate the transmitting of the capability of the UE to transmit data in a first message of a random access procedure. The first message may be a msg1 (e.g., similar to the msg1 412 of FIG. 4A or msg1 452 of FIG. 4B). The UE may be operating in an idle mode and, thus, may not maintain an active connection with the base station. In one aspect, to enable the base station to allocate pre-configured UL resources, the UE may transmit an indication of its timing drift to the base station to indicate how the clock of the UE may drift over time. It should be appreciated that the capability of the UE to transmit data may include the capability to transmit reference signals, such as DM-RS, in a first message of a random access procedure.

At 904, the UE may receive a pool of pre-configured UL resources for data or DM-RS from the base station. For example, a reception component 1016 may facilitate the receiving of the pool of pre-configured UL resources for data or DM-RS. The pre-configured UL resources may be contention-based resources to be shared by the UE with other UEs, or may be contention-free resources reserved for use by the UE. In one aspect, the UL resources may overlap, partially or wholly, with resources allocated for legacy channels. In one aspect, the UL resources may be configured on a multi-step basis in which a first set of resources may be allocated for a first transmission and a second set of resources may be allocated for potential retransmissions if the first transmission is not received. In one aspect, the UL resource for the data and the DM-RS are allocated separately in which the pre-configured UL resources allocated for the data and for the DM-RS may have implicit or explicit linkages. The linkages may be determined based on one or more of the DM-RS sequences, DM-RS multiplexing patterns, or DM-RS resource location in time and frequency. In one aspect, the pre-configured UL resources may include a number of repetitions of one or more subsets of the UL resources, and a periodicity of one or more subsets of the UL resources so that the same pattern of resource allocation may repeat for the UE with the specified periodicity across multiple frames. In one aspect, the pre-configured UL resources may include an indication of a frequency-domain hopping pattern across repetitions or subframes in one or more subsets of the UL resources. In one aspect, the pre-configured UL resources may include an indication of the transport block sizes that may be used by a UE for transmitting data. In one aspect, the pre-configured UL resources may include an indication of power control used for transmitting or retransmitting DM-RS or data. In one aspect, the pre-configured UL resources may include an indication of the multiplexing scheme to be used for transmitting DM-RS and data on contention-based resources. In one aspect, the pre-configured UL resources may include an indication of the DM-RS sequences and associated DM-RS resource locations in time and frequency that may be used by the UE, including an appropriate value of related parameters, such as the number of cyclic shifts that are allowed for the DM-RS sequences.

At 906, the UE may determine a multiplexing scheme for transmitting DM-RS or data on pre-configured UL resources that are contention-based. For example, a multiplexing and transmission schemes determination component 1006 may facilitate the determining of the multiplexing scheme for transmitting DM-RS or data on the pre-configured UL resources that are contention-based. The multiplexing scheme may be in the time, frequency, or code-domains. For example, the multiplexing scheme may include the use of frequency-domain comb patterns across subcarriers in a symbol, the use of cover codes across symbols or subframes, the use of cyclic shifts of orthogonal sequences across subcarriers, symbols, or subframes, or the use of HARQ RV index patterns across subframes.

At 908, the UE may determine the bandwidth, granularity, and linkage between the pre-configured UL resources for data and DM-RS. For example, a UL resource determination component 1008 may facilitate the determining of the bandwidth, granularity, and linkage between the pre-configured UL resources for data and DM-RS. In one aspect, the UL resources for the DM-RS may have a different bandwidth from that of the UL resources for the data. For example, the front-loaded DM-RS resources may have a different bandwidth than the bandwidth of the UL resources allocated for the data. In one aspect, UL resources allocated for the data and for the DM-RS may have implicit or explicit linkages. The linkages may be determined based on one or more of the DM-RS sequences, DM-RS multiplexing patterns, or DM-RS locations in time and frequency. In one aspect, the granularity of the allocated UL resources may be at the PRB level, at the sub-PRB level, or at a higher level than the PRB.

In one aspect, the UE may determine a transmission scheme for repeating the transmission of data across subframes of the pre-configured UL resources. In one aspect, the UE may receive an indication for the transmission scheme. For example, the UE may receive an indication of a frequency-domain hopping pattern across repetitions or subframes in one or more subsets of the UL resources. The UE may receive a hopping enable/disable indication. When the hopping indication is enabled, the UE may use the specified frequency hopping pattern to transmit data repeated across subframes to increase the probability of successful reception or to increase the CE level. In one aspect, the UE may apply a HARQ RV index pattern across subframes of repeated data. In one aspect, the UE may apply a scrambling sequence, a cover code, or an OCC pattern across subframes of repeated data.

In one aspect, the UE may apply a time, a frequency, and/or a code-domain transmission technique when transmitting DM-RS on contention based UL resources. In one aspect, the UE may apply a cyclic shift of orthogonal sequences in the time domain across subcarriers, symbols, or subframes when transmitting DM-RS on the pre-configured UL resources. In one aspect, the UE may apply a frequency-domain comb pattern of subcarriers in a symbol when transmitting DM-RS on the pre-configured UL resources. In one aspect, the UE may apply a scrambling sequence, a cover code, or an OCC pattern across symbols of a subframe, or across multiple subframes when transmitting DM-RS on the pre-configured UL resources. In one aspect, the UE may apply a frequency-domain hopping pattern across subframes when transmitting DM-RS on the pre-configured UL resources. In one aspect, the UE may apply a cyclic shift of a DM-RS sequence when transmitting DM-RS on the pre-configured UL resources. In one aspect, the UE may transmit DM-RS on the pre-configured UL resources in a non-orthogonal or in a quasi-orthogonal manner.

At 910, the UE may transmit the data in a first random access procedure message by selecting resources for the data transmission from the pool of pre-configured UL resources. For example, an UL data and DM-RS transmission component 1010 may facilitate the transmitting of the data in the first random access procedure message. The UE may transmit the data using a time, frequency, code-domain multiplexing scheme, or a combination thereof on contention-based UL resources. In one aspect, the UE may transmit repetitions of data across subframes. In one aspect, the UE may transmit the DM-RS using a transmission and multiplexing scheme. In one aspect, UE may transmit the DM-RS or data using the power control received from the base station. In one aspect, the UE may use a last, valid timing advance from a previous random access procedure to transmit the first random access procedure message comprising the data using the pre-configured UL resources.

At 912, the UE may transmit data using one or more of a code-multiplexing technique using an OCC, a frequency-multiplexing technique using a comb patterns, or a collision-based technique when transmitting data on contention-based UL resources. For example, the UL data and DM-RS transmission component 1010 may facilitate the transmitting of the data. In one aspect, the UE may transmit data using a combination of a frequency-domain hopping pattern, a HARQ RV index pattern, a scrambling sequence, a cover code, or an OCC when transmitting data repeated across subframes on the pre-configured UL resources.

At 914, the UE may transmit DM-RS on the pre-configured UL resources. For example, the UL data and DM-RS transmission component 1010 may facilitate the transmitting of the DM-RS on the pre-configured UL resources. In some aspects, the UE may transmit the DM-RS using a combination of an orthogonal sequence with a cyclic shift, a frequency-domain comb pattern, a scrambling sequence, a cover code, an OCC pattern, a frequency-domain hopping pattern, a DM-RS sequence with a cyclic shift, a non-orthogonal technique, and/or a quasi-orthogonal technique.

At 916, the UE may receive an indication from the base station if the UL transmission of the data (and/or the DM-RS) was unsuccessful. For example, a retransmission determination component 1012 may facilitate the receiving of the indication if the UL transmission failed. For example, the base station may not receive the data (and/or the DM-RS) transmission from the UE if the transmission collides with transmission(s) from other UEs.

At 918, the UE may retransmit on an additional set of pre-configured resources. For example, the retransmission determination component 1012 may facilitate the retransmitting on an additional set of pre-configured resources. In one aspect, the additional set of pre-configured resources may already have been allocated using a multi-step basis in which the base station may allocate a first set of resources for a first transmission, and may allocate a second set, and maybe more sets of resources, for potential retransmissions if the base station does not receive the first transmission. The second set, or any subsequent sets, of resources may have a larger allocation than that of the first set, or earlier sets. For example, the later sets of resources may have a larger number of repetitions (e.g., more subframes) to increase the coverage extension level.

Figure 10:
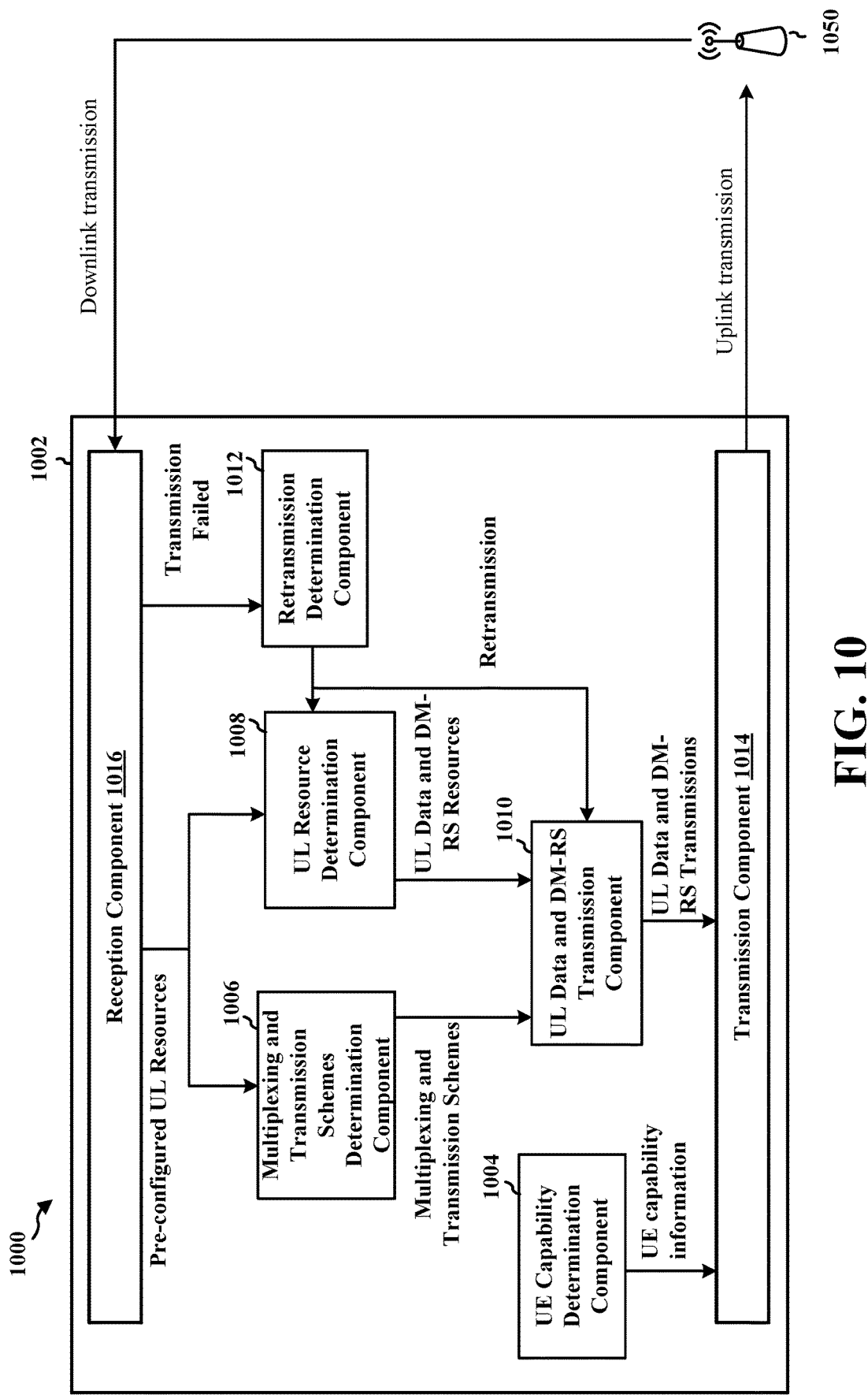
FIG. 10 is a conceptual data flow diagram illustrating the data flow between different means/components in an exemplary apparatus of a UE in accordance with certain aspects of the disclosure.

FIG. 10 is a conceptual data flow diagram 1000 illustrating the data flow between different means/components in an exemplary apparatus 1002. The apparatus 1002 may be a UE or a component of the UE. The apparatus 1002 may include a UE capability determination component 1004, a multiplexing and transmission schemes determination component 1006, an UL resource determination component 1008, an UL data and DM-RS transmission component 1010, a retransmission determination component 1012, a transmission component 1014, and a reception component 1016.

The UE capability determination component 1004 may be configured to generate capability information of the UE. The UE may be operating in an idle mode and, thus, may not maintain an active connection with a base station, such as a base station 1050. In one aspect, to enable the base station to allocate pre-configured UL resources, the UE may transmit its timing drift information to the base station to indicate how the clock of the UE may change over time. The UE capability determination component 1004 may be configured to transmit the capability (and timing drift information) of the UE to the base station through the transmission component 1014.

The multiplexing and transmission schemes determination component 1006 may be configured to determine a multiplexing scheme for transmitting DM-RS or data on pre-configured UL resources that are contention-based based on the pre-configured UL resources received from the base station. The multiplexing and transmission schemes determination component 1006 may be configured to receive the pre-configured UL resources through the reception component 1016. The multiplexing scheme may be in the time, frequency, or code-domains. For example, the multiplexing scheme may include the use of frequency-domain comb patterns across subcarriers in a symbol, the use of cover codes across symbols or subframes, the use of cyclic shifts of orthogonal sequences across subcarriers, symbols, or subframes, or the use of HARQ RV index patterns across subframes.

The multiplexing and transmission schemes determination component 1006 may also be configured to determine a transmission scheme for repeating the transmission of data across subframes of the pre-configured UL resources. In one aspect, the UE may receive an indication for the transmission scheme. For example, the UE may receive an indication of a frequency-domain hopping pattern across repetitions or subframes in one or more subsets of the UL resources. The UE may receive a hopping enable/disable indication. When the hopping indication is enabled, the UE may use the specified frequency hopping pattern to transmit data repeated across subframes to increase the probability of successful reception or to increase the CE level. In one aspect, the UE may apply a HARQ RV index pattern across subframes of repeated data. In one aspect, the UE may apply a scrambling sequence, a cover code, or an OCC pattern across subframes of repeated data.

The multiplexing and transmission schemes determination component 1006 may also be configured to determine a multiplexing scheme and a transmission scheme for the DM-RS. In one aspect, the UE may apply a time, a frequency, and/or a code-domain transmission technique when transmitting DM-RS on contention based UL resources. In one aspect, the UE may apply a cyclic shift of orthogonal sequences in the time domain across subcarriers, symbols, or subframes when transmitting DM-RS on the pre-configured UL resources. In one aspect, the UE may apply a frequency-domain comb pattern of subcarriers in a symbol when transmitting DM-RS on the pre-configured UL resources. In one aspect, the UE may apply a scrambling sequence, a cover code, or an OCC pattern across symbols of a subframe, or across multiple subframes when transmitting DM-RS on the pre-configured UL resources. In one aspect, the UE may apply a frequency-domain hopping pattern across subframes when transmitting DM-RS on the pre-configured UL resources. In one aspect, the UE may apply a cyclic shift of a DM-RS sequence when transmitting DM-RS on the pre-configured UL resources. In one aspect, the UE may transmit DM-RS on the pre-configured UL resources in a non-orthogonal or in a quasi-orthogonal manner.

The UL resource determination component 1008 may be configured to determine the UL resources such as the bandwidth, granularity, and linkage between the pre-configured UL resources for data and DM-RS. In one aspect, the UL resources for the DM-RS may have a different bandwidth from that of the UL resources for the data. For example, the front-loaded DM-RS resources may have a different bandwidth than the bandwidth of the UL resources allocated for the data. In one aspect, UL resources allocated for the data and for the DM-RS may have implicit or explicit linkages. The linkages may be determined based on one or more of the DM-RS sequences, DM-RS multiplexing patterns, or DM-RS locations in time and frequency. In one aspect, the granularity of the allocated UL resources may be at the PRB level, at the sub-PRB level, or at a higher level than the PRB.

The UL data and DM-RS transmission component 1010 may be configured to generate the UL data (and/or the DM-RS) on the pre-configured UL resources based on the multiplexing and transmission schemes from the multiplexing and transmission schemes determination component 1006 and the UL data and DM-RS resources from the UL resource determination component 1008. The data may be transmitted using a time, frequency, code-domain multiplexing scheme, or a combination thereof on contention-based UL resources. In one aspect, the data may be repeated across subframes. In one aspect, the data may be transmitted using one or more of a code-multiplexing technique using an OCC, a frequency-multiplexing technique using a comb patterns, or a collision-based technique when transmitting data on contention-based UL resources. In one aspect, the UE may transmit data using a combination of a frequency-domain hopping pattern, a HARQ RV index pattern, a scrambling sequence, a cover code, or an OCC when transmitting data repeated across subframes on the pre-configured UL resources.

In one aspect, the DM-RS may be transmitted using a transmission and multiplexing scheme. In one aspect, the DM-RS may be transmitted on the pre-configured UL resources using a combination of an orthogonal sequence with a cyclic shift, a frequency-domain comb pattern, a scrambling sequence, a cover code, an OCC pattern, a frequency-domain hopping pattern, a DM-RS sequence with a cyclic shift, a non-orthogonal technique, or a quasi-orthogonal technique. In one aspect, the DM-RS or data may be transmitted using the power control received from the base station.

The retransmission determination component 1012 may be configured to receive a transmission failure indication from the base station 1050 if the UL transmission of the data or the DM-RS fails. For example, the base station 1050 may not receive the data or the DM-RS transmissions from the UE if the transmission collides with transmission(s) from other UEs. If the transmission fails, the retransmission determination component 1012 may be configured to generate a retransmission indication to the UL resource determination component 1008 to retransmit on an additional set of pre-configured resources. In one aspect, the additional set of DM-RS or data resources may already have been allocated on a multi-step basis in which the base station may allocate a first set of resources for a first transmission, and may allocate a second set, and maybe more sets of resources, for potential retransmissions if the base station does not receive the first transmission. The second set, or any subsequent sets, of resources may have a larger allocation than that of the first set, or earlier sets. For example, the later sets of resources may have a larger number of repetitions (e.g., more subframes) to increase the coverage extension level.

The apparatus 1002 includes the reception component 1016 that receives downlink communication from the base station 1050 and the transmission component 1014 that transmits uplink communication to the base station 1050.

The apparatus may include additional components that perform each of the blocks of the algorithm in the aforementioned flowcharts of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
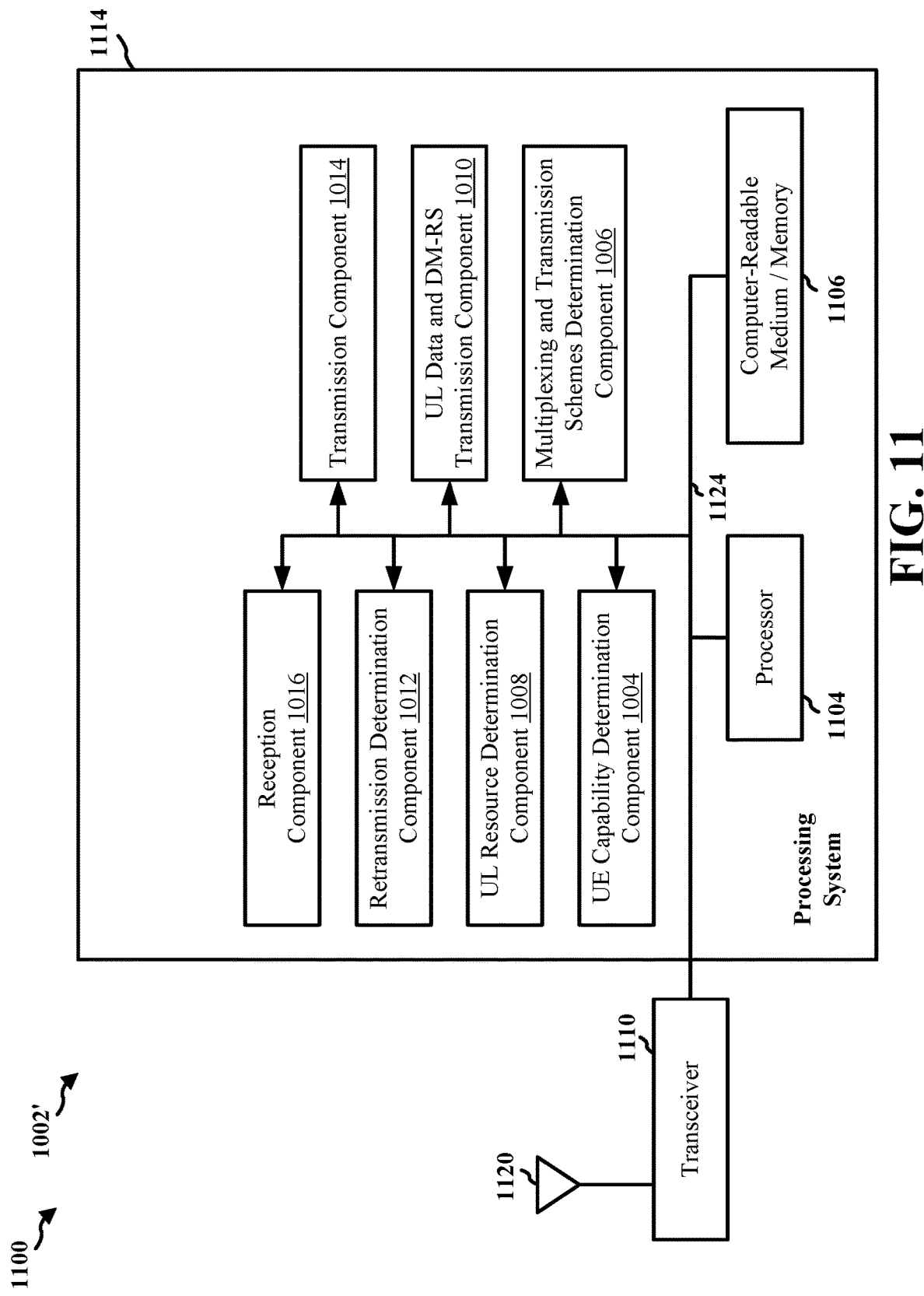
FIG. 11 is a diagram illustrating an example of a hardware implementation for an apparatus of a UE employing a processing system in accordance with certain aspects of the disclosure.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, 1016, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1016. In addition, the transceiver 1110 receives information from the processing system 1114, specifically the transmission component 1014, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014, 1016. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359. Alternatively, the processing system 1114 may be the entire UE (e.g., see the UE 350 of FIG. 3).

In one configuration, the apparatus 1002/1002' for wireless communication include s means for transmitting, to a base station, a capability of the UE to transmit data in a first message of a random access procedure. The apparatus 1002/1002' may include means for receiving pre-configured UL resources from the base station. The apparatus 1002/1002' may include means for transmitting data in the first message of the random access procedure using the pre-configured UL resources. The apparatus 1002/1002' may include means for using a last, valid timing advance from a previous random access procedure to transmit the first random access procedure message comprising the data using the pre-configured UL resources. The apparatus 1002/1002' may include means for receiving the pre-configured UL resources in one of a broadcast message in an SIB or in an RRC configured unicast message. The apparatus 1002/1002' may include means for transmitting the data using a multiplexing scheme in an orthogonal manner in contention-based UL resources shared by the UE and one or more other UEs. The apparatus 1002/1002' may include means for transmitting DM-RS using a multiplexing scheme in anonorthogonal manner in contention-based UL resources shared by the UE and one or more other UEs. The apparatus 1002/1002' may include means for transmitting the data with a transmit power based on the indication of power control. The apparatus 1002/1002' may include means for transmitting the data using no multiplexing scheme in a subset of the pre-configured contention-based UL resources shared by the UE and one or more other UEs. The apparatus 1002/1002' may include means for transmitting the data using a first set of pre-configured UL resources. The apparatus 1002/1002' may include means for receiving an indication that the base station fails to receive the data transmitted using the first set of pre-configured UL resources. The apparatus 1002/1002' may include means for retransmitting the data in a grant-free manner on the second set of pre-configured UL resources to the base station. The apparatus 1002/1002' may include means for transmitting an indication of a timing drift of the UE. The apparatus 1002/1002' may include means for transmitting information related to timing drift of the UE.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
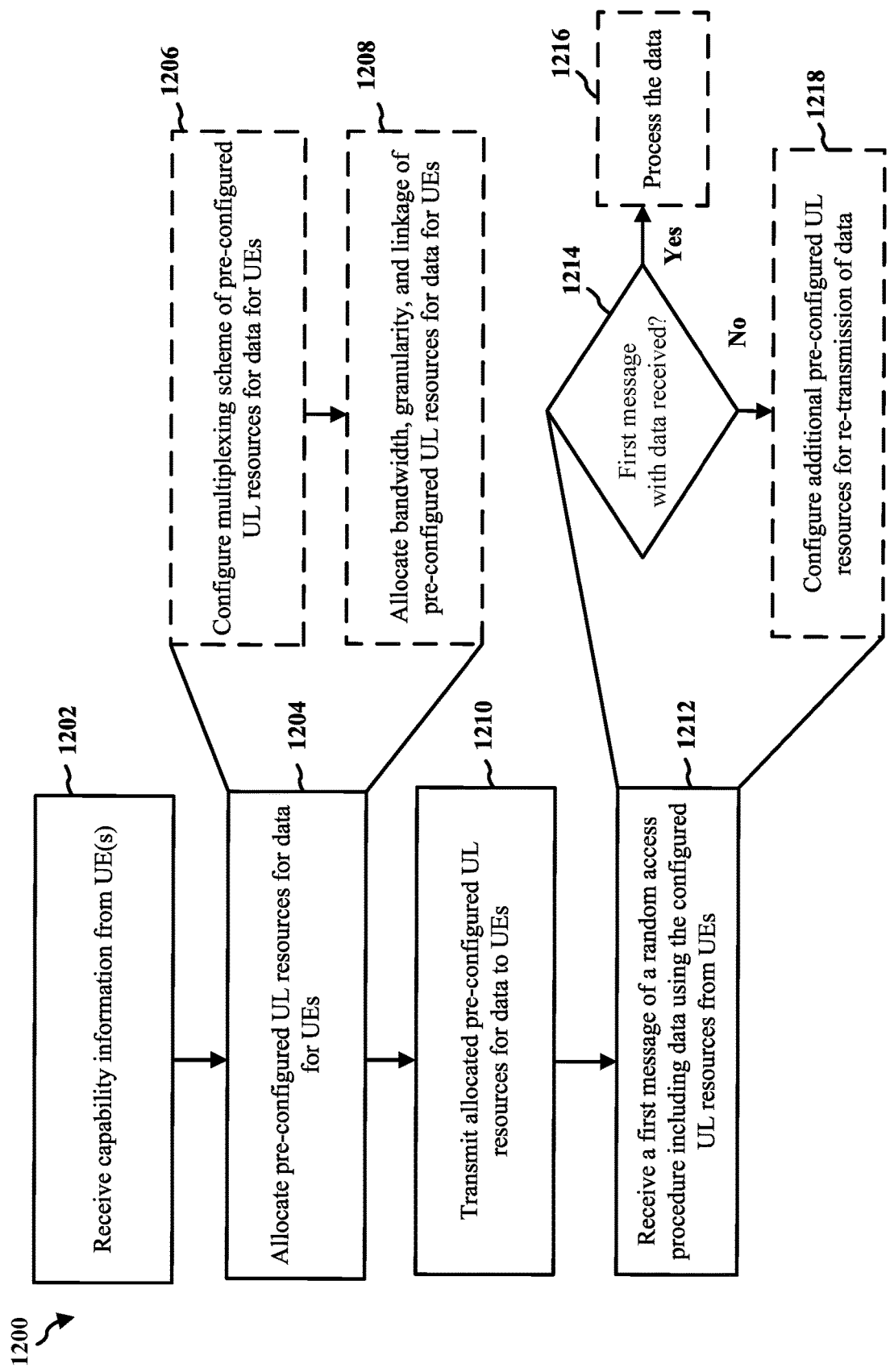
FIG. 12 is a flowchart of a method of wireless communication that may be implemented by a base station in accordance with certain aspects of the disclosure.

FIG. 12 is a flowchart 1200 of a method of wireless communication that may be implemented by a base station or a component of a base station (e.g., the base station 102/180, the base station 310, the base station 404, the base station 504, the apparatus 1302/1302', and/or the processing system 1414, which may include the memory 376 and which may be the entire base station 310 or a component of the base station 310, such as the TX processor 316, the RX processor 370, and/or the controller/processor 375) in accordance with certain aspects of the disclosure. The flowchart 1200 of FIG. 12 is a method that facilitates a UE using pre-configured UL resources for transmitting data in a first message of a random access procedure, which may improve the transmission efficiency and/or power consumption of the UE during uplink transmissions. Optional aspects are illustrated with a dashed line.

At 1202, the base station may receive capability information from UE(s) indicating that the respective UE(s) are capable of transmitting data in a first random access procedure message. For example, a UE capability reception component 1304 of the apparatus 1302/1302' may facilitating the receiving of the capability information from the UE(s). In one aspect, the UEs may be operating in an idle mode and, thus, may not have an active connection with the base station. In some examples, to enable the base station to allocate pre-configured UL resources, the UEs may transmit their timing drift information to the base station to indicate the timing offset of the UEs from the system reference time.

At 1204, the base station may allocate pre-configured UL resources for data (e.g., data and/or DM-RS) for the UEs.

For example, an UL resource allocation component 1308 may facilitate the allocating of the pre-configured UL resources. The pre-configured UL resources may be contention-based resources to be shared by the UEs, or may be contention-free resources reserved for use by a particular UE. In one aspect, the base station may allocate contention-based resources or contention-free resources as a function of the number of UEs in a cell, the coverage area of the cell, the potential for interference by the UEs in a cell, the potential for inter-cell interference, etc. For example, the base station may allocate contention-based resources or contention-free resources as a function of the probability distribution of timing drifts based on the timing drift information received from the UEs. In one aspect, to decrease the probability of collided transmissions from multiple UEs, the base station may group the UEs by intervals of timing drifts. Because UEs from different interval groups are less likely to transmit at the same time, the base station may allocate contention-free or partially contention-based UL resources for these UEs. In one aspect, the base station may allocate the UL resources to minimize inter-cell interference between adjacent cells. In one aspect, the base station may allocate the UL resources as a function of the desired CE level. In one aspect, the base station may allocate the UL resources so that they overlap, partially or wholly, with resources allocated for legacy channels. In one aspect, the base station may allocate separate UL resources for DM-RS and for data.

At 1206, the base station may signal multiplexing schemes of the pre-configured UL resources that are allocated for contention-based data or DM-RS transmissions for the UEs. For example, a multiplexing and transmission schemes configuration component 1306 may facilitate the signaling of the multiplexing schemes of the pre-configured UL resources. In one aspect, the multiplexing schemes may be in the time, frequency, or code-domains. For example, the multiplexing schemes may include the use of frequency-domain comb patterns across subcarriers in a symbol, the use of cover codes across symbols or subframes, the use of cyclic shifts of orthogonal sequences across subcarriers, symbols, or subframes, or the use of HARQ RV index patterns across subframes.

At 1208, the base station may allocate the bandwidth, granularity, and linkage between the pre-configured UL resources for data. For example, the UL resource allocation component 1308 may facilitate the allocating of the bandwidth, granularity, and linkage between the pre-configured UL resources for data. In one aspect, the UL resources for DM-RS may have a different bandwidth from that of the UL resources for the data. For example, the front-loaded DM-RS resources may have a different bandwidth than the bandwidth of the UL resources allocated for the data. In one aspect, UL resources allocated for the data and for the DM-RS may have implicit or explicit linkages. The linkages may be determined based on one or more of the DM-RS sequences, DM-RS multiplexing patterns, or DM-RS locations in time and frequency. In one aspect, the granularity of the allocated UL resources may be at the PRB level, at the sub-PRB level, or at a higher level than the PRB.

In one aspect, the base station may signal a transmission scheme for repeating the transmission of data across subframes of the pre-configured UL resources. In one aspect, the base station may signal an indication of a frequency-domain hopping pattern across repetitions or subframes in one or more subsets of the UL resources. The base station may signal a hopping enable/disable indication. In one aspect, the base station may signal a number of repetitions of one or more subsets of the pre-configured UL resources, and a periodicity of one or more subsets of the pre-configured UL resources so that the same pattern of resource allocation may repeat for a UE with the specified periodicity across multiple frames. In one aspect, the base station may signal an indication of the transport block sizes that may be used by a UE for transmitting data. In one aspect, the base station may signal an indication of power control used for transmitting or retransmitting data. In one aspect, the base station may signal an indication of the DM-RS sequences and associated DM-RS resource locations in time and frequency that may be used by a UE, including an appropriate value of related parameters, such as the number of cyclic shifts that are allowed for the DM-RS sequences.

At 1210, the base station may transmit the allocated pre-configured UL resources for the data to the UEs. For example, an UL resources transmission component 1310 may facilitate the transmitting of the allocated pre-configured UL resources to the UEs. In one aspect, the base station may transmit information related to contention-based UL resources as a broadcast message to the UEs. For example, the base station may broadcast the configuration information as SIB. In one aspect, the base station may transmit information related to contention-based or partially contention-based UL resources on a unicast message targeted to a specific UE. For example, the base station may transmit the configuration information for a specific UE as a RRC configured unicast message.

At 1212, the base station may receive data in a first message of a random access procedure on pre-configured UL resource from the UEs. For example, an UL data and DM-RS reception component 1312 may facilitate the receiving of the first random access procedure message comprising data on the pre-configured UL resource. In one aspect, the data may be received from the UEs using a time, frequency, code-domain multiplexing scheme, or a combination thereof on contention-based UL resources. In one aspect, data may be repeated across subframes. In one aspect, the base station may receive the data from the UEs based on a code-multiplexing technique using an OCC, a frequency-multiplexing technique using a comb patterns, or a collision-based technique on contention-based UL resources. In one aspect, the base station may receive the data from the UEs based on a combination of a frequency-domain hopping pattern, a HARQ RV index pattern, a scrambling sequence, a cover code, or an OCC when the data are repeated across subframes on the pre-configured UL resources. In one aspect, the base station may receive DM-RS on the pre-configured UL resources based a combination of an orthogonal sequence with a cyclic shift, a frequency-domain comb pattern, a scrambling sequence, a cover code, an OCC pattern, a frequency-domain hopping pattern, a DM-RS sequence with a cyclic shift, a non-orthogonal technique, or a quasi-orthogonal technique.

At 1214, the base station may determine whether a first message of a random access procedure is received and includes data. For example, the UL data and DM-RS reception component 1312 may facilitate the determining of whether a first message of a random access procedure is received and whether the first message includes data. If the first message is received and includes data, then, at 1216, the base station may process the data. However, if there is a failed reception, the base station may configure an additional set of data resources over which the UEs may try to retransmit. For example, if the failure is due to a collision of transmissions, the base station may allocate a larger set of resources, such as a larger bandwidth, to avoid collisions.

At 1218, the base station may configure additional pre-configured UL resources for retransmission of data if the data is not received. For example, the UL resource allocation component 1308 may facilitate the configuring of additional pre-configured UL resources for retransmission. In one aspect, the additional set of data resources may already have been allocated on a multi-step basis in which the base station may allocate a first set of resources for a first transmission, and may allocate a second set, and maybe more sets of resources, for potential retransmissions if the base station does not receive the first transmission. The second set, or any subsequent sets, of resources may have a larger allocation than that of the first set, or earlier sets. For example, the later sets of resources may have a larger number of repetitions (e.g., more subframes) to increase the coverage extension level. In one aspect, the base station may signal a back-off timer or indicator to the UEs before the next retransmissions for collision avoidance. In one aspect, the base station may signal the UEs to fall back to EDT or the legacy random access procedure that requires the UEs to make scheduling requests to acquire resource grants.

Figure 13:
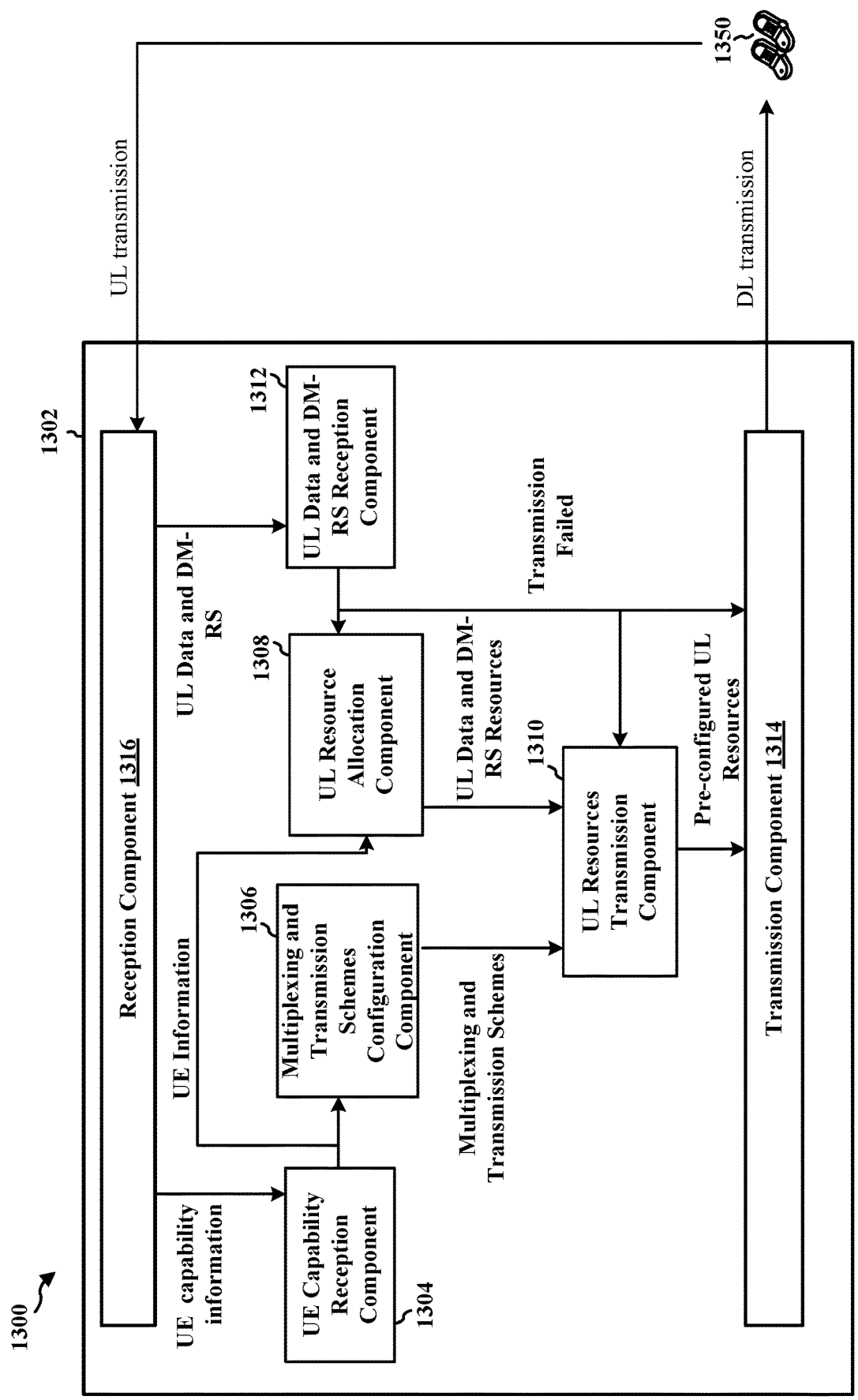
FIG. 13 is a conceptual data flow diagram illustrating the data flow between different means/components in an exemplary apparatus of a base station in accordance with certain aspects of the disclosure.

FIG. 13 is a conceptual data flow diagram 1300 illustrating the data flow between different means/components in an exemplary apparatus 1302. The apparatus 1302 may be a base station or a component of the base station. The apparatus 1302 may include a UE capability reception component 1304, a multiplexing and transmission schemes configuration component 1306, an UL resource allocation component 1308, an UL data and DM-RS reception component 1312, an UL resource transmission component 1310, a transmission component 1314, and a reception component 1316.

The UE capability reception component 1304 may be configured to receive capability information from UEs 1350 through the reception component 1316 and to provide the UE capability information to the other components to generate pre-configured UL resources for the UEs 1350. In some examples, the capability information may additionally include timing drift information. In one aspect, the UEs 1350 may be operating in an idle mode and, thus, may not maintain an active connection with the base station. In some examples, to enable the base station to allocate pre-configured UL resources, the UEs may transmit their timing drift information to the base station to indicate the timing offset of the UEs from the system reference time. The UL resource allocation component 1308 may be configured to allocate pre-configured UL resources for DM-RS or data for the UEs based on the UE information received from the UE capability reception component 1304. The pre-configured UL resources may be contention-based resources to be shared by the UEs, or may be contention-free resources reserved for use by a specific UE. In one aspect, the base station may allocate contention-based resources or contention-free resources as a function of the number of UEs in a cell, the coverage area of the cell, the potential for interference by the UEs in a cell, the potential for inter-cell interference, etc. For example, the base station may allocate contention-based resources or contention-free resources as a function of the probability distribution of timing drifts based on the timing drift information received from the UEs. In one aspect, to decrease the probability of collided transmissions from multiple UEs, the base station may group the UEs by intervals of timing drifts. Because UEs from different interval groups are less likely to transmit at the same time, the base station may allocate contention-free or partially contention-based UL resources for these UEs. In one aspect, the base station may allocate the UL resources to minimize inter-cell interference between adjacent cells. In one aspect, the base station may allocate the UL resources as a function of the desired CE level. In one aspect, the base station may allocate the UL resources so that they overlap, partially or wholly, with resources allocated for legacy channels. In one aspect, the base station may allocate separate UL resources for DM-RS and for data.

The UL resource allocation component 1308 may also be configured to allocate the bandwidth, granularity, and linkage between the pre-configured UL resources for data. In one aspect, the UL resources for the DM-RS may have a different bandwidth from that of the UL resources for the data. For example, the front-loaded DM-RS resources may have a different bandwidth than the bandwidth of the UL resources allocated for the data. In one aspect, UL resources allocated for the data and for the DM-RS may have implicit or explicit linkages. The linkages may be determined based on one or more of the DM-RS sequences, DM-RS multiplexing patterns, or DM-RS locations in time and frequency. In one aspect, the granularity of the allocated UL resources may be at the PRB level, at the sub-PRB level, or at a higher level than the PRB.

The multiplexing and transmission schemes configuration component 1306 may be configured to configure multiplexing schemes of the pre-configured UL resources that are allocated for contention-based data or DM-RS transmissions for the UEs. In one aspect, the multiplexing schemes may be in the time, frequency, or code-domains. For example, the multiplexing schemes may include the use of frequency-domain comb patterns across subcarriers in a symbol, the use of cover codes across symbols or subframes, the use of cyclic shifts of orthogonal sequences across subcarriers, symbols, or subframes, or the use of HARQ RV index patterns across subframes.

The multiplexing and transmission schemes configuration component 1306 may also be configured to configure a transmission scheme for repeating the transmission of data across subframes of the pre-configured UL resources. In one aspect, the base station may configure an indication of a frequency-domain hopping pattern across repetitions or subframes in one or more subsets of the UL resources. The base station may configure a hopping enable/disable indication. In one aspect, the base station may configure a number of repetitions of one or more subsets of the pre-configured UL resources, and a periodicity of one or more subsets of the pre-configured UL resources so that the same pattern of resource allocation may repeat for a UE with the specified periodicity across multiple frames. In one aspect, the base station may configure an indication of the potential transport block sizes that may be used by a UE for transmitting data. In one aspect, the base station may configure an indication of power control used for transmitting or retransmitting data. In one aspect, the base station may configure an indication of the DM-RS sequences and associated DM-RS resource locations in time and frequency that may be used by a UE, including an appropriate value of related parameters, such as the number of cyclic shifts that are allowed for the DM-RS sequences.

The UL resource transmission component 1310 may be configured to transmit allocated pre-configured UL resources for data to UEs through the transmission component 1314 based on the multiplexing and transmission schemes from the multiplexing and transmission schemes configuration component 1306 and the UL resource allocation component 1308. In one aspect, the base station may transmit information related to contention-based UL resources as a broadcast message to the UEs.

For example, the base station may broadcast the configuration information as SIB. In one aspect, the base station may transmit information related to contention-based or partially contention-based UL resources on a unicast message targeted to a specific UE. For example, the base station may transmit the configuration information for a specific UE as a RRC configured unicast message.

The UL data and DM-RS reception component 1312 may be configured to receive the data in a first random access procedure message on pre-configured UL resources from the UEs through the reception component 1316. In one aspect, the data may be received from the UEs using a time, frequency, code-domain multiplexing scheme, or a combination thereof on contention-based UL resources. In one aspect, the data may be repeated across subframes. In one aspect, the data may be received from the UEs based on a code-multiplexing technique using an OCC, a frequency-multiplexing technique using a comb patterns, or a collision-based technique on contention-based UL resources. In one aspect, the data may be received from the UEs based on a combination of a frequency-domain hopping pattern, a HARQ RV index pattern, a scrambling sequence, a cover code, or an OCC when the data are repeated across subframes on the pre-configured UL resources. In one aspect, DM-RS may be received on the pre-configured UL resources based a combination of an orthogonal sequence with a cyclic shift, a frequency-domain comb pattern, a scrambling sequence, a cover code, an OCC pattern, a frequency-domain hopping pattern, a DM-RS sequence with a cyclic shift, a non-orthogonal technique, or a quasi-orthogonal technique.

The UL data and DM-RS reception component 1312 may also be configured to determine if there is a failed reception. If there is a failure, the UL data and DM-RS reception component 1312 may be configured to generate a transmission failed indication to the UL resource allocation component 1308. The UL resource allocation component 1308 may be configured to generate an additional set of data resources over which the UEs may try to retransmit. For example, if the failure is due to a collision of transmissions, the UL resource allocation component 1308 may allocate a larger set of resources, such as a larger bandwidth, to avoid collisions. The transmission failed indication may be transmitted to the UEs through the transmission component 1314. In one aspect, the additional set of data resources may already have been allocated on a multi-step basis in which the base station may allocate a first set of resources for a first transmission, and may allocate a second set, and maybe more sets of resources, for potential retransmissions if the base station does not receive the first transmission. The second set, or any subsequent sets, of resources may have a larger allocation than that of the first set, or earlier sets. For example, the later sets of resources may have a larger number of repetitions (e.g., more subframes) to increase the coverage extension level. In one aspect, the base station may signal a back-off timer or indicator to the UEs before the next retransmissions for collision avoidance. In one aspect, the base station may signal the UEs to fall back to EDT or the legacy random access procedure that requires the UEs to make scheduling requests to acquire resource grants.

The apparatus 1302 includes the reception component 1316 that receives uplink communication from the UEs 1350 and the transmission component 1314 that transmits downlink communication to the UEs 1350.

The apparatus may include additional components that perform each of the blocks of the algorithm in the aforementioned flowchart of FIG. 12. As such, each block in the aforementioned flowchart of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
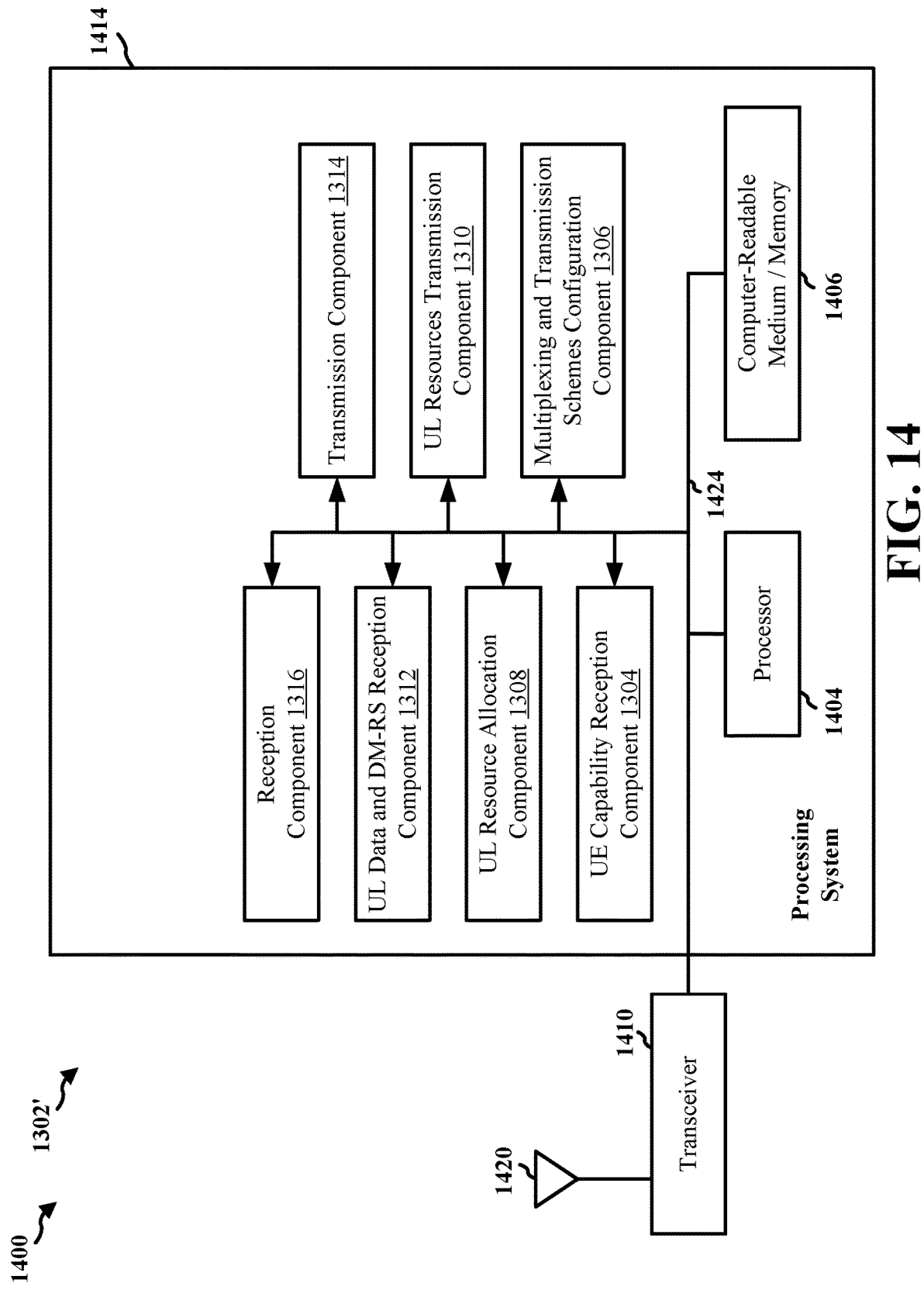
FIG. 14 is a diagram illustrating an example of a hardware implementation for an apparatus of a base station employing a processing system in accordance with certain aspects of the disclosure.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, 1312, 1314, 1316, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1316. In addition, the transceiver 1410 receives information from the processing system 1414, specifically the transmission component 1314, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310, 1312, 1314, 1316. The components may be software components running in the processor 1404, resident/stored in the computer readable medium/memory 1406, one or more hardware components coupled to the processor 1404, or some combination thereof. The processing system 1414 may be a component of the base station 310 and may include the memory 376 and/or at least one of the TX processor 316, the RX processor 370, and the controller/processor 375. Alternatively, the processing system 1414 may be the entire base station (e.g., see the base station 310 of FIG. 3)

In one configuration, the apparatus 1302/1302' for wireless communication includes means for receiving capability information of one or more UEs that the respective UE is capable of transmitting data in a first message of a random access procedure. The apparatus 1302/1302' may also include means for allocating pre-configured UL resources for the one or more UEs. The apparatus 1302/1302' may also include means for transmitting the pre-configured UL resources to the one or more UEs. The apparatus 1302/1302' may also include means for receiving data in a first message of a random access procedure on the pre-configured UL resources from the one or more UEs. The apparatus 1302/1302' may also include means for transmitting the pre-configured UL resources in one of a broadcast message in an SIB to a plurality of the UEs or in an RRC configured unicast message to one of the UEs. The apparatus 1302/1302' may also include means for allocating the UL resources based on a cell ID associated with the base station. The apparatus 1302/1302' may also include means for allocating pre-configured DM-RS resources for transmitting DM-RS and allocating pre-configured data resources for transmitting data for the one or more UEs. The apparatus 1302/1302' may also include means for configuring at least one of a number of repetitions of a subset of the pre-configured UL resources, an indication of a frequency-domain hopping pattern across repetitions or subframes in a subset of the pre-configured UL resources, a periodicity of a subset of the pre-configured UL resources, a transport block size used for transmitting data, an indication of a multiplexing scheme for transmitting data in a subset of the pre-configured UL resources, an indication of one or more DM-RS sequences configured, an allowed number of cyclic shifts of the DM-RS sequences, or an indication of power control for transmitting data in a subset of the pre-configured UL resources. The apparatus 1302/1302' may also include means for receiving the data based on the multiplexing scheme in an orthogonal manner in the pre-configured UL resources shared by the one or more UEs. The apparatus 1302/1302' may also include means for receiving DM-RS based on the multiplexing scheme in a non-orthogonal manner in the pre-configured UL resources shared by the one or more UEs. The apparatus 1302/1302' may also include means for receiving the data with a transmit power based on the indication of power control from the one UE. The apparatus 1302/1302' may also include means for receiving the data without a multiplexing scheme in the pre-configured UL resources shared by the one or more UEs. The apparatus 1302/1302' may also include means for recovering the data transmitted by the one of the UEs from data transmissions by other UEs. The apparatus 1302/1302' may also include means for allocating a first set of pre-configured UL resources for a first transmission of data from one of the UEs and a second set of pre-configured UL resources for a potential retransmission of the data from the one UE. The apparatus 1302/1302' may also include means for detecting a failure of receiving the data on the first set of pre-configured UL resources. The apparatus 1302/1302' may also include means for transmitting an indication of the failure to the one UE. The apparatus 1302/1302' may also include means for receiving the data in a first random access procedure message on the second set of pre-configured UL resources from the one UE. The apparatus 1302/1302' may also include means for detecting a failure of receiving the data on the pre-configured UL resources from one of the UEs. The apparatus 1302/1302' may also include means for configuring additional UL resources for the one UE. The apparatus 1302/1302' may also include means for transmitting the additional UL resources to the one UE. The apparatus 1302/1302' may also include means for allocating UL resources for transmitting the data in a connected mode by one of the UEs when the one UE is triggered by the base station. The apparatus 1302/1302' may also include means for receiving an indication of time drifts of the one or more UEs. The apparatus 1302/1302' may also include means for allocating the pre-configured UL resources based on a coverage extension level. The apparatus 1302/1302' may also include means for decoding DM-RS independently of the data. The apparatus 1302/1302' may also include means for receiving information related to timing drift of the one or more UEs.

The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
transmitting, to a base station, a capability of the UE to transmit data in a first message of a random access procedure, the random access procedure being a two-step random access procedure or a four-step random access procedure;
receiving pre-configured uplink (UL) resources from the base station in a radio resource control (RRC) configured unicast message; and
transmitting UL data in the first message of the random access procedure using the pre-configured UL resources, the first message being a msg1 of the random access procedure.

2. The method of claim 1, wherein the UE uses a last, valid timing advance from a previous random access procedure to transmit the first message of the random access procedure comprising the UL data using the pre-configured UL resources.

3. The method of claim 1, wherein the pre-configured UL resources comprise contention-based UL resources, wherein the UE shares the contention-based UL resources with one or more other UEs.

4. The method of claim 1, wherein the pre-configured UL resources comprise contention-free UL resources that are dedicated to the UE.

5. The method of claim 1, wherein receiving the pre-configured UL resources from the base station further comprises receiving the pre-configured UL resources in a broadcast message in a system information block (SIB).

6. The method of claim 1, wherein the pre-configured UL resources are configured based on a cell identification (ID) associated with the base station.

7. The method of claim 1, wherein the pre-configured UL resources overlap with resources configured for a UL legacy channel.

8. The method of claim 1, wherein the pre-configured UL resources comprise demodulation reference signals (DM-RS) resources pre-configured for transmitting DM RS, and data resources pre-configured for transmitting the UL data.

9. The method of claim 8, wherein the DM-RS resources comprise one or more symbols at a start of a subframe.

10. The method of claim 8, wherein the DM-RS resources comprise one or more DM-RS sequences configured for transmitting the DM-RS and an allowed number of cyclic shifts of the one or more DM-RS sequences.

11. The method of claim 10, wherein the one or more DM-RS sequences are configured based on an identification (ID) of the UE.

12. The method of claim 10, wherein a first location in time and frequency of the data resources is linked to the one or more DM-RS sequences or a second location in time and frequency of the DM-RS resources.

13. The method of claim 8, wherein a first bandwidth of the data resources is linked to a second bandwidth of the DM-RS resources.

14. The method of claim 13, wherein the first bandwidth of the data resources is different from the second bandwidth of the DM-RS resources.

15. The method of claim 1, wherein the pre-configured UL resources comprise at least one of a number of repetitions of a subset of the pre-configured UL resources, a first indication of a frequency-domain hopping pattern across repetitions or subframes in the subset of the pre-configured UL resources, a periodicity of the subset of the pre-configured UL resources, a transport block size used for transmitting the UL data, a second indication of a multiplexing scheme for transmitting the UL data in the subset of the pre-configured UL resources, a third indication of one or more demodulation reference signals (DM-RS) sequences configured for transmitting DM-RS, an allowed number of cyclic shifts of the one or more DM-RS sequences, or a fourth indication of power control for transmitting the UL data in the subset of the pre-configured UL resources.

16. The method of claim 15, wherein the multiplexing scheme comprises at least one of:
a frequency-domain comb pattern across subcarriers in a symbol,
a cover code across symbols or subframes,
a cyclic shift of orthogonal sequences across subcarriers, symbols, or subframes, or
use of a hybrid automatic repeat request (HARD) redundancy version (RV) index pattern across subframes.

17. The method of claim 16, wherein transmitting the UL data in the first message of the random access procedure on the pre-configured UL resources comprises transmitting the UL data using the multiplexing scheme in an orthogonal manner in contention-based UL resources shared by the UE and one or more other UEs.

18. The method of claim 16, wherein transmitting the UL data in the first message of the random access procedure on the pre-configured UL resources comprises transmitting the DM-RS using the multiplexing scheme in a non-orthogonal manner in contention-based UL resources shared by the UE and one or more other UEs.

19. The method of claim 15, wherein transmitting the UL data in the first message of the random access procedure on the pre-configured UL resources comprises transmitting the UL data with a transmit power based on the fourth indication of the power control.

20. The method of claim 15, wherein transmitting the UL data in the first message of the random access procedure on the pre-configured UL resources comprises transmitting the UL data using no multiplexing scheme in a subset of pre-configured contention-based UL resources shared by the UE and one or more other UEs.

21. The method of claim 1, wherein the pre-configured UL resources comprise a first set of pre-configured UL resources for a first transmission of the UL data and a second set of pre-configured UL resources for a potential retransmission of the UL data.

22. The method of claim 21, wherein transmitting the UL data in the first message of the random access procedure on the pre-configured UL resources comprises transmitting the UL data using the first set of pre-configured UL resources, wherein the method further comprises:
receiving an indication that the base station fails to receive the UL data transmitted using the first set of pre-configured UL resources, and
retransmitting the UL data in the first message of the random access procedure on the second set of pre-configured UL resources to the base station.

23. The method of claim 1, wherein the pre-configured UL resources comprise UL resources pre-configured for transmitting the UL data in a connected mode when the UE is triggered by the base station.

24. The method of claim 1, wherein transmitting the capability of the UE to the base station comprises transmitting an indication of a timing drift of the UE.

25. The method of claim 1, wherein the pre-configured UL resources are configured based on a desired coverage extension level.

26. The method of claim 1, wherein demodulation reference signals (DM-RS) are decoded independently of the UL data.

27. The method of claim 1, wherein transmitting the capability of the UE to the base station comprises transmitting information related to timing drift of the UE.

28. A method of wireless communication at a base station, comprising:
receiving a capability of one or more user equipment (UEs) indicating that respective UEs are capable of transmitting data in a first message of a random access procedure, the random access procedure being a two-step random access procedure or a four-step random access procedure;
allocating pre-configured uplink (UL) resources for the one or more UEs;
transmitting the pre-configured UL resources to a first UE of the one or more UEs in a radio resource control (RRC) configured unicast message; and
receiving UL data in the first message of the random access procedure on the pre-configured UL resources from the first UE, the first message being a msg1 of the random access procedure.

29. The method of claim 28, wherein the pre-configured UL resources comprise contention-based UL resources, wherein a plurality of the one or more UEs share the contention-based UL resources.

30. The method of claim 28, wherein the pre-configured UL resources comprise contention-free UL resources that are dedicated to one UE of the one or more UEs.

31. The method of claim 28, wherein transmitting the pre-configured UL resources further comprises transmitting the pre-configured UL resources in a broadcast message in a system information blocks (SIB) to a plurality of the one or more UEs.

32. The method of claim 28, wherein allocating the pre-configured UL resources for the one or more UEs comprises allocating the pre-configured UL resources based on a cell identification (ID) associated with the base station.

33. The method of claim 28, wherein the pre-configured UL resources overlap with resources configured for a UL legacy channel.

34. The method of claim 28, wherein allocating the pre-configured UL resources for the one or more UEs comprises allocating pre-configured demodulation reference signals (DM-RS) resources for transmitting DM-RS and allocating pre-configured data resources for transmitting the UL data for the one or more UEs.

35. The method of claim 34, wherein the pre-configured DM-RS resources comprise one or more symbols at a start of a subframe.

36. The method of claim 34, wherein the pre-configured DM-RS resources comprise one or more DM-RS sequences configured for transmitting the DM-RS and an allowed number of cyclic shifts of the one or more DM-RS sequences.

37. The method of claim 36, wherein the one or more DM-RS sequences for the first UE are configured based on an identification (ID) of the first UE.

38. The method of claim 36, wherein a first location in time and frequency of the pre-configured data resources is linked to the one or more DM-RS sequences or a second location in time and frequency of the pre-configured DM-RS resources.

39. The method of claim 34, wherein a first bandwidth of the pre-configured data resources is linked to a second bandwidth of the pre-configured DM-RS resources.

40. The method of claim 39, wherein the first bandwidth of the pre-configured data resources is different from the second bandwidth of the pre-configured DM-RS resources.

41. The method of claim 28, wherein allocating the pre-configured UL resources for the one or more UEs comprises configuring at least one of a number of repetitions of a subset of the pre-configured UL resources, a first indication of a frequency-domain hopping pattern across repetitions or subframes in the subset of the pre-configured UL resources, a periodicity of the subset of the pre-configured UL resources, a transport block size used for transmitting the UL data, a second indication of a multiplexing scheme for transmitting the UL data in the subset of the pre-configured UL resources, a third indication of one or more demodulation reference signals (DM-RS) sequences configured for transmitting DM-RS, an allowed number of cyclic shifts of the one or more DM-RS sequences, or a fourth indication of power control for transmitting the UL data in the subset of the pre-configured UL resources.

42. The method of claim 41, wherein the multiplexing scheme comprises at least one of:
a frequency-domain comb pattern across subcarriers in a symbol,
a cover code across symbols or subframes,
a cyclic shift of orthogonal sequences across subcarriers, symbols, or subframes, or
use of a hybrid automatic repeat request (HARD) redundancy version (RV) index pattern across subframes.

43. The method of claim 42, wherein receiving the UL data in the first message of the random access procedure on the pre-configured UL resources from the first UE comprises receiving the UL data based on the multiplexing scheme in an orthogonal manner in the pre-configured UL resources shared by the one or more UEs.

44. The method of claim 42, wherein receiving the UL data in the first message of the random access procedure on the pre-configured UL resources from the first UE comprises receiving the DM-RS based on the multiplexing scheme in a non-orthogonal manner in the pre-configured UL resources shared by the one or more UEs.

45. The method of claim 41, wherein receiving the UL data in the first message of the random access procedure on the pre-configured UL resources from the first UE comprises receiving the UL data with a transmit power based on the fourth indication of the power control.

46. The method of claim 41, wherein receiving the UL data in the first message of the random access procedure on the pre-configured UL resources from the first UE comprises receiving the UL data with no multiplexing scheme in the pre-configured UL resources shared by the one or more UEs.

47. The method of claim 28, further comprising recovering the UL data transmitted by the first UE from data transmissions by other UEs.

48. The method of claim 28, wherein allocating the pre-configured UL resources for the one or more UEs comprises allocating a first set of pre-configured UL resources for a first transmission of the UL data from one of the one or more UEs and a second set of pre-configured UL resources for a potential retransmission of the UL data from the first UE.

49. The method of claim 48, wherein receiving the UL data in the first message of the random access procedure on the pre-configured UL resources from the first UE comprises detecting a failure of receiving the UL data on the first set of pre-configured UL resources, wherein the method further comprises:

transmitting an indication of the failure to the first UE, and receiving the UL data in the first message of the random access procedure on the second set of pre-configured UL resources from the first UE.

50. The method of claim 28, wherein receiving the UL data in the first message of the random access procedure on the pre-configured UL resources from the first UE comprises detecting a failure of receiving the UL data on the pre-configured UL resources from the first UE, wherein the method further comprises:

configuring additional UL resources for the first UE, and transmitting the additional UL resources to the first UE.

51. The method of claim 28, wherein allocating the pre-configured UL resources for the one or more UEs comprises allocating UL resources for transmitting the UL data in a connected mode by one of the one or more UEs when the first UE is triggered by the base station.

52. The method of claim 28, wherein receiving the capability of the one or more UEs comprises receiving an indication of time drifts of the one or more UEs.

53. The method of claim 28, wherein allocating the pre-configured UL resources for the one or more UEs comprises allocating the pre-configured UL resources based on a coverage extension level.

54. The method of claim 28, wherein receiving the UL data in the first message of the random access procedure on the pre-configured UL resources comprises decoding demodulation reference signals (DM-RS) independently of the UL data.

55. The method of claim 28, wherein receiving the capability of the one or more UEs comprises receiving information related to timing drift of the one or more UEs.

56. The method of claim 28, wherein receiving the UL data in the first message of the random access procedure on the pre-configured UL resources from the first UE is associated with a last, valid timing advance from a previous random access procedure of the first UE.

57. An apparatus for wireless communication at a user equipment (UE), comprising:

memory; and at least one processor coupled to the memory and configured to cause the UE to:

transmit a capability of the UE to transmit data in a first message of a random access procedure to a base station, the random access procedure being a two-step random access procedure or a four-step random access procedure;

receive pre-configured uplink (UL) resources from the base station in a radio resource control (RRC) configured unicast message; and transmit UL data in the first message of the random access procedure using the pre-configured UL resources to the base station, the first message being a msg1 of the random access procedure.

58. An apparatus for wireless communication at a base station, comprising:

memory; and at least one processor coupled to the memory and configured to cause the base station to:

receive a capability of one or more user equipment (UEs) indicating that respective UEs are capable of transmitting data in a first message of a random access procedure, the random access procedure being a two-step random access procedure or a four-step random access procedure;

allocate pre-configured uplink (UL) resources for the one or more UEs;

transmit the pre-configured UL resources to a first UE of the one or more UEs in a radio resource control (RRC) configured unicast message; and receive UL data in the first message of the random access procedure on the pre-configured UL resources from the first UE, the first message being a msg1 of the random access procedure.

59. An apparatus for wireless communication at a user equipment (UE), comprising:

means for transmitting, to a base station, a capability of the UE to transmit data in a first message of a random access procedure, the random access procedure being a two-step random access procedure or a four-step random access procedure;

means for receiving pre-configured uplink (UL) resources from the base station in a radio resource control (RRC) configured unicast message; and means for transmitting UL data in the first message of the random access procedure using the pre-configured UL resources, the first message being a msg1 of the random access procedure.

60. An apparatus for wireless communication, comprising:

means for receiving a capability of one or more user equipment (UEs) indicating that respective UEs are capable of transmitting data in a first message of a random access procedure, the random access procedure being a two-step random access procedure or a four-step random access procedure;

means for allocating pre-configured uplink (UL) resources for the one or more UEs;

means for transmitting the pre-configured UL resources to a first UE of the one or more UEs in a radio resource control (RRC) configured unicast message; and means for receiving UL data in the first message of the random access procedure on the pre-configured UL resources from the first UE, the first message being a msg1 of the random access procedure.

61. A non-transitory computer-readable medium storing computer executable code at a user equipment (UE), the computer executable code, when executed, to cause at least one processor of the UE to:

transmit a capability of a first device to transmit data in a first message of a random access procedure to a second device, the random access procedure being a two-step random access procedure or a four-step random access procedure;

receive pre-configured uplink (UL) resources from the second device in a radio resource control (RRC) configured unicast message; and transmit UL data in the first message of the random access procedure using the pre-configured UL resources to the second device, the first message being a msg1 of the random access procedure.

62. A non-transitory computer-readable medium storing computer executable code at a base station, the computer executable code, when executed, to cause at least one processor of the base station to:

receive a capability of one or more devices indicating that respective devices are capable of transmitting data in a first message of a random access procedure, the random access procedure being a two-step random access procedure or a four-step random access procedure;

allocate pre-configured uplink (UL) resources for the one or more devices;

transmit the pre-configured UL resources to a first device of the one or more devices in a radio resource control (RRC) configured unicast message; and receive UL data in the first message of the random access procedure on the pre-configured UL resources from the first device, the first message being a msg1 of the random access procedure.

\* \* \* \* \*